United States Patent
Yamaga

(10) Patent No.: US 11,651,781 B2
(45) Date of Patent: *May 16, 2023

(54) TAPE-SHAPED MAGNETIC RECORDING MEDIUM AND CARTRIDGE

(71) Applicant: Sony Group Corporation, Tokyo (JP)

(72) Inventor: Minoru Yamaga, Tokyo (JP)

(73) Assignee: Sony Group Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/598,728

(22) PCT Filed: May 9, 2019

(86) PCT No.: PCT/JP2019/018533
§ 371 (c)(1),
(2) Date: Sep. 27, 2021

(87) PCT Pub. No.: WO2020/202584
PCT Pub. Date: Oct. 8, 2020

(65) Prior Publication Data
US 2022/0148618 A1     May 12, 2022

(30) Foreign Application Priority Data

Mar. 29, 2019    (JP) .............................. JP2019-069188

(51) Int. Cl.
*G11B 5/008*     (2006.01)
*G11B 5/78*      (2006.01)
(Continued)

(52) U.S. Cl.
CPC .......... *G11B 5/00817* (2013.01); *G11B 5/584* (2013.01); *G11B 5/78* (2013.01);
(Continued)

(58) Field of Classification Search
None
See application file for complete search history.

(56) References Cited

U.S. PATENT DOCUMENTS 11,031,033 B2 * 6/2021 Terakawa et al. ....... G11B 5/78
11,183,209 B2 * 11/2021 Yamaga et al. .......... G11B 5/78
(Continued)

FOREIGN PATENT DOCUMENTS

JP     2010238346 A     10/2010
JP     2011216149 A     10/2011
(Continued)

OTHER PUBLICATIONS

International Search Report dated Jul. 9, 2019 in connection with PCT/JP2019/018533.

*Primary Examiner* — Craig A. Renner
(74) *Attorney, Agent, or Firm* — K&L Gates LLP

(57) ABSTRACT

A magnetic recording medium according to the present technology is a tape-shaped magnetic recording medium including: a base material; and a magnetic layer, the tape-shaped magnetic recording medium being long in a longitudinal direction and short in a width direction, in which the magnetic layer includes a data band long in the longitudinal direction and a servo band long in the longitudinal direction, a data signal being written to the data band, a servo signal being written to the servo band, the degree of perpendicular orientation of the magnetic layer being 65% or more, a full width at half maximum of an isolated waveform in a reproduced waveform of the data signal is 185 nm or less, a thickness of the magnetic layer is 90 nm or less, and a thickness of the base material is 4.2 μm or less.

27 Claims, 8 Drawing Sheets

(51) Int. Cl.
*G11B 20/12* (2006.01)
*G11B 5/584* (2006.01)
*G11B 21/10* (2006.01)

(52) U.S. Cl.
CPC ........ *G11B 20/1202* (2013.01); *G11B 21/103* (2013.01); *G11B 2220/93* (2013.01)

(56) References Cited

U.S. PATENT DOCUMENTS

| | | | |
|---|---|---|---|
| 11,302,351 B2 * | 4/2022 | Yamaga et al. | G11B 5/78 |
| 2010/0247968 A1 | 9/2010 | Ishikawa et al. | |
| 2014/0268414 A1 | 9/2014 | Nakashio et al. | |
| 2017/0162220 A1 | 6/2017 | Nakashio et al. | |
| 2018/0374507 A1 | 12/2018 | Kasada | |
| 2020/0402531 A1 * | 12/2020 | Yamaga et al. | G11B 5/78 |
| 2020/0411042 A1 * | 12/2020 | Yamaga et al. | G11B 5/78 |
| 2021/0012805 A1 * | 1/2021 | Terakawa et al. | G11B 5/78 |

FOREIGN PATENT DOCUMENTS

| | | |
|---|---|---|
| JP | 2014117905 A | 6/2014 |
| JP | 2014199706 A | 10/2014 |
| JP | 2019008847 A | 1/2019 |
| WO | 2015198514 A1 | 12/2015 |

\* cited by examiner

TAPE-SHAPED MAGNETIC RECORDING MEDIUM AND CARTRIDGE

TECHNICAL FIELD

The present technology relates to a technology of a magnetic recording medium and the like.

BACKGROUND ART

In recent years, a magnetic recording medium has been widely used for backing up electronic data, and the like. As one magnetic recording medium, a magnetic recording medium including a magnetic layer has been widely used.

In the magnetic layer of the magnetic recording medium, a data band including a plurality of recording tracks is provided, and data is recorded on these recording tracks. In addition, in the magnetic layer, servo bands are provided at positions where data band is sandwiched in the lateral direction, and a servo signal is recorded on this servo band. A magnetic head reads the servo signal recorded on the servo band, and is aligned with respect to the recording track by using the read servo signal.

As a recording method to a magnetic recording medium, a horizontal magnetic recording method in which magnetic particles in the magnetic layer are magnetized in a horizontal direction to record data and a perpendicular magnetic recording method in which magnetic particles in the magnetic layer are magnetized in a perpendicular direction to record data are known. The perpendicular magnetic recording method can record data with high density as compared with the horizontal magnetic recording method.

CITATION LIST

Patent Literature

Patent Literature 1: Japanese Patent Application Laid-open No. 2014-199706

DISCLOSURE OF INVENTION

Technical Problem

In recent years, further high-density recording has been demanded because of an increase in the amount of data to be recorded, and there is a need for a technology capable of further improving the recording density of data.

In view of the circumstances as described above, it is an object of the present technology to provide a technology capable of further improving the recording density of data.

Solution to Problem

A magnetic recording medium according to the present technology is a tape-shaped magnetic recording medium including: a magnetic layer, the tape-shaped magnetic recording medium being long in a longitudinal direction and short in a width direction, in which the magnetic layer includes a data band long in the longitudinal direction and a servo band long in the longitudinal direction, a data signal being written to the data band, a servo signal being written to the servo band, the degree of perpendicular orientation of the magnetic layer being 65% or more, a full width at half maximum of an isolated waveform in a reproduced waveform of the data signal is 185 nm or less, a thickness of the magnetic layer is 90 nm or less, and a thickness of the base material is 4.2 μm or less.

As a result, the recording density of data can be further improved.

In the magnetic recording medium, the full width at half maximum of the isolated waveform may be 170 nm or less.

In the magnetic recording medium, the full width at half maximum of the isolated waveform may be 150 nm or less.

In the magnetic recording medium, the full width at half maximum of the isolated waveform may be 130 nm or less.

In the magnetic recording medium, the full width at half maximum of the isolated waveform may be 110 nm or less.

In the above-mentioned magnetic recording medium, the degree of perpendicular orientation may be 70% or more.

In the above-mentioned magnetic recording medium, the degree of perpendicular orientation may be 75% or more.

In the above-mentioned magnetic recording medium, the degree of perpendicular orientation may be 80% or more.

In the magnetic recording medium, the data band may include a plurality of recording tracks that is long in the longitudinal direction, aligned in the width direction, and has a predetermined recording track width for each track in the width direction, a servo signal recording pattern may include a plurality of stripes inclined at a predetermined azimuth angle with respect to the width direction, and a distance between a point P1 and a point P2 in the longitudinal direction may be 0.08 μm or more, the point P1 representing an arbitrary point on an arbitrary stripe of the plurality of stripes, the point P2 representing a point on the arbitrary stripe located away from the point P1 in the width direction by an amount corresponding to the recording track width.

In the magnetic recording medium, the distance between the point P1 and the point P2 in the longitudinal direction may be 0.62 μm or less.

In the above-mentioned magnetic recording medium, the degree of longitudinal orientation of the magnetic layer may be 35% or less.

The above-mentioned magnetic recording medium may have a coercive force of 2,000 Oe or less in the longitudinal direction.

In the magnetic recording medium, a ratio of an area of the servo band to an area of an entire surface of the magnetic layer may be 4.0% or less.

In the above-mentioned magnetic recording medium, the magnetic layer may contain a magnetic powder, and the magnetic powder may have a particle volume of 2,300 $nm^3$ or less.

In the above-mentioned magnetic recording medium, the number of data bands may be 4n (n represents an integer greater than or equal to two), and the number of servo bands may be 4n+1.

In the above-mentioned magnetic recording medium, a width of the servo band may be 95 μm or less.

In the magnetic recording medium, the data band may include a plurality of recording tracks that is long in the longitudinal direction, aligned in the width direction, and has a predetermined recording track width for each track in the width direction, and the recording track width may be 2.0 μm or less.

In the above-mentioned magnetic recording medium, one bit length in the longitudinal direction in a data signal to be recorded on the data band may be 48 nm or less.

In the above-mentioned magnetic recording medium, the magnetic layer may include a magnetic powder of hexagonal ferrite, ε-iron oxide, or cobalt-containing ferrite.

In the magnetic recording medium, a value of σ1.5-σ0.5 may be 0.6 N or less in a tensile test of the magnetic recording medium in the longitudinal direction, σ0.5 being a load at an elongation of 0.5% in the magnetic recording medium, σ1.5 being a load at an elongation of 1.5% in the magnetic recording medium.

In the magnetic recording medium, a shrinkage ratio in the longitudinal direction when the magnetic recording medium is preserved at 60° C. for 72 hours may be 0.1% or less.

In the magnetic recording medium, a thickness of the magnetic recording medium may be 5.6 μm or less.

In the magnetic recording medium, a value of (TL−TB)/TB may be 0.41 or less, TB being a thickness of the base material, TL being a thickness of the magnetic recording medium.

In the magnetic recording medium, a Young's modulus of the magnetic recording medium in the longitudinal direction may be 8.5 GPa or less.

In the magnetic recording medium, a Young's modulus of the base material in the longitudinal direction may be 8.0 GPa or less.

In the magnetic recording medium, a width of the magnetic recording medium may be adjusted by increasing or decreasing tension in the longitudinal direction.

A cartridge according to the present technology is a cartridge including: a tape-shaped magnetic recording medium including a base material, and a magnetic layer, the magnetic recording medium being long in a longitudinal direction and short in a width direction, in which the magnetic layer includes a data band long in the longitudinal direction and a servo band long in the longitudinal direction, a data signal being written to the data band, a servo signal being written to the servo band, the degree of perpendicular orientation of the magnetic layer being 65% or more, a full width at half maximum of an isolated waveform in a reproduced waveform of the data signal is 185 nm or less, a thickness of the magnetic layer is 90 nm or less, and a thickness of the base material is 4.2 μm or less.

Advantageous Effects of Invention

As described above, in accordance with the present technology, it is possible to provide a technology capable of further improving the recording density of data.

BRIEF DESCRIPTION OF DRAWINGS

FIG. 5 is a schematic diagram showing a data recording device.

MODE(S) FOR CARRYING OUT THE INVENTION

Hereinafter, an embodiment according to the present technology will be described with reference to the drawings.

<Configuration of Magnetic Recording Medium>

Figure 1:
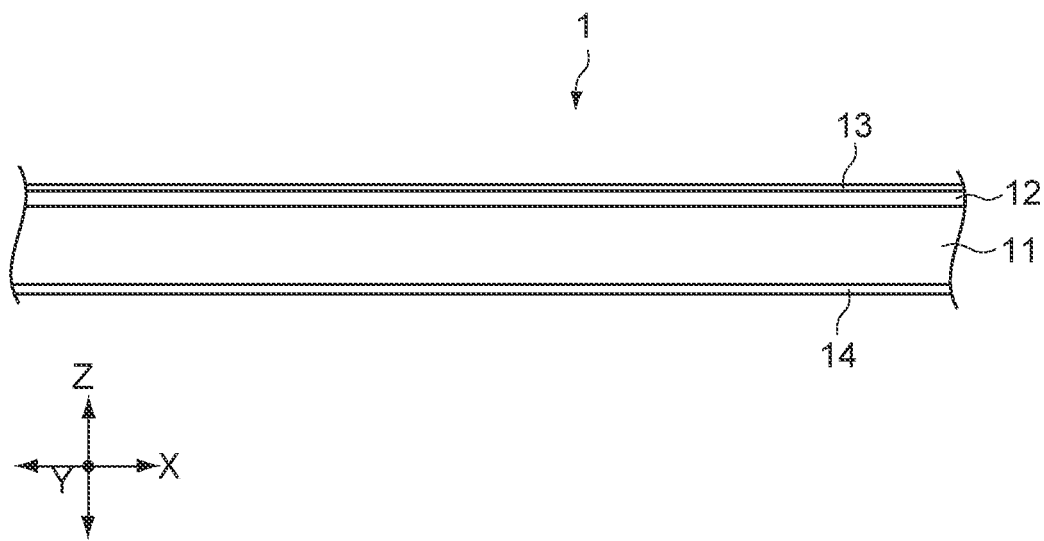
FIG. 1 is a schematic diagram of a magnetic recording medium as viewed from the side.

First, the basic configuration of a magnetic recording medium 1 will be described. FIG. 1 is a schematic diagram of the magnetic recording medium 1 as viewed from the side.

Figure 2:
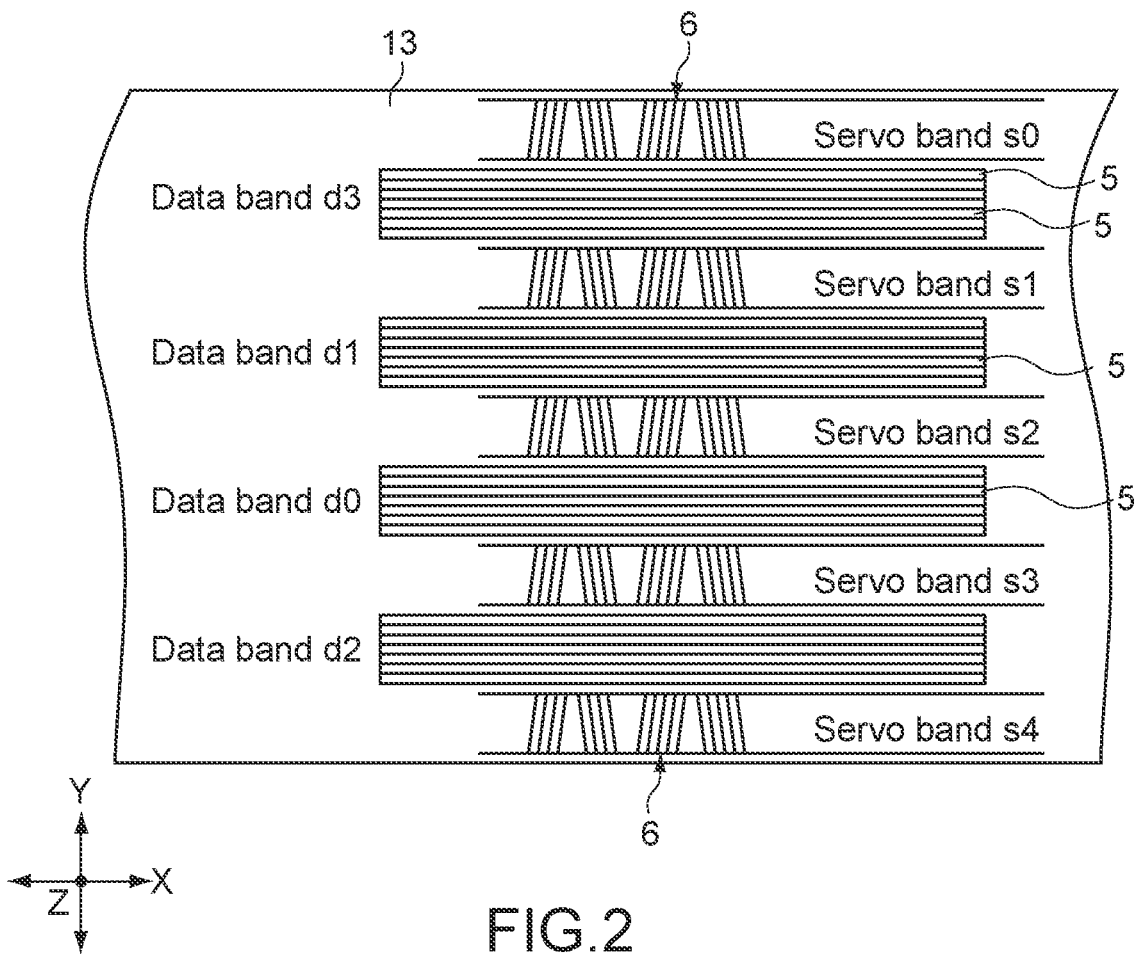
FIG. 2 is a schematic diagram of the magnetic recording medium as viewed from above.

As shown in FIG. 1 and FIG. 2, the magnetic recording medium 1 has a tape shape that is long in the longitudinal direction (X-axis direction), short in the width direction (Y-axis direction), and thin in the thickness direction (Z axis direction). Note that in the present specification (and the drawings), a coordinate system with reference to the magnetic recording medium 1 is represented by an XYZ coordinate system.

The magnetic recording medium 1 is configured to be capable of recording signals at the shortest recording wavelengths of favorably 96 nm or less, more favorably 75 nm or less, still more favorably 60 nm or less, and particularly favorably 50 nm or less. The magnetic recording medium 1 is favorably used in a data recording device including a ring-type head as a recording head.

Referring to FIG. 1, the magnetic recording medium 1 includes a tape-shaped base material 11 that is long in the longitudinal direction (X-axis direction), a non-magnetic layer 12 provided on one main surface of the base material 11, a magnetic layer 13 provided on the non-magnetic layer 12, and a back layer 14 provided on the other main surface of the base material 11. Note that the back layer 14 may be provided as necessary and the back layer 14 may be omitted.

[Base Material]

The base material 11 is a non-magnetic support that supports the non-magnetic layer 12 and the magnetic layer 13. The base material 11 has a long film-like shape. The upper limit value of the average thickness of the base material 11 is favorably 4.2 μm or less, more favorably 3.8 μm or less, and still more favorably 3.4 μm. When the upper limit value of the average thickness of the base material 11 is 4.2 μm or less, the recording capacity in one cartridge 21 (see FIG. 5) can be made higher than that in a general magnetic recording medium.

The average thickness of the base material 11 is determined as follows. First, the magnetic recording medium 1 having a ½ inch width is prepared and cut into a length of 250 mm to prepare a sample. Subsequently, the layers (i.e. the non-magnetic layer 12, the magnetic layer 13, and the back layer 14) other than the base material 11 of the sample are removed with a solvent such as MEK (methylethylketone) and dilute hydrochloric acid. Next, using a laser hologage manufactured by Mitsutoyo as a measuring device, the thickness of the sample (base material 11)—is measured at positions of five or more points, and the measured values are simply averaged (arithmetically averaged) to calculate the average thickness of the base material 11. Note that the measurement positions are randomly selected from the sample.

The base material 11 contains, for example, at least one selected from the group consisting of polyesters, polyolefins, cellulose derivatives, vinyl resins, and different polymer resins. In the case where the base material 11 contains two or more of the above-mentioned materials, the two or more materials may be mixed, copolymerized, or stacked.

The polyesters include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins include, for example, at least one of PE (polyethylene) or PP (polypropylene). The cellulose derivatives include, for example, at least one of cellulose diacetate, cellulose triacetate, CAB (cellulose acetate butyrate), and CAP (cellulose acetate propionate). The vinyl resins include, for example, at least one of PVC (polyvinyl chloride) or PVDC (polyvinylidene chloride).

The different polymer resins include, for example, at least one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), polyether ester, PES (polyethersulfone), PEI (polyether imide), PSF (polysulfone), PPS (polyphenylene sulfide), PC (polycarbonate), PAR (polyarylate), or PU (polyurethane).

[Magnetic Layer]

The magnetic layer 13 is a recording layer for recording data signals. The magnetic layer 13 contains a magnetic powder, a binder, conductive particles, and the like. The magnetic layer 13 may further contain additives such as a lubricant, an abrasive, and a rust inhibitor, as necessary. The magnetic layer 13 has a surface in which a large number of holes are provided. The lubricant is stored in the large number of holes. It is favorable that the large number of holes extend in the direction perpendicular to the surface of magnetic layer.

The degree of perpendicular orientation (no demagnetizing field correction: the same applies hereinafter) of the magnetic layer 13 is typically 65% or more. Further, the degree of degree of longitudinal orientation of the magnetic layer 13 is typically 35% or less.

The thickness of the magnetic layer 13 is typically 35 nm or more and 90 nm or less. By setting the thickness of the magnetic layer 13 to 35 nm or more and 90 nm or less as described above, it is possible to improve the electromagnetic conversion characteristics. Further, from the viewpoint of the full width at half maximum (described below) of the isolated waveform in the reproduced waveform of a data signal, the thickness of the magnetic layer 13 is favorably 90 nm or less, more favorably, 80 nm or less, more favorably 60 nm or less, and still more favorably 40 nm. When the thickness of the magnetic layer 13 is 90 nm or less, the peak of the reproduced waveform of the data signal can be sharpened by narrowing the full width at half maximum of the isolated waveform in the reproduced waveform of the data signal (to 185 nm or less). As a result, the accuracy of reading the data signal is improved, and thus, it is possible to increase the number of recording tracks to improve the recording density of data (as will be described in detail below).

The thickness of the magnetic layer 13 can be obtained, for example, in the following manner. First, the magnetic recording medium 1 is thinly processed perpendicular to the main surface thereof to prepare a sample piece, and the cross section of the test piece is observed by a transmission electron microscope (TEM) under the following conditions.

Device: TEM (H9000NAR manufactured by Hitachi, Ltd.)

Acceleration voltage: 300 kV

Magnification: 100,000 times

Next, after measuring the thickness of the magnetic layer 13 at least 10 points in the longitudinal direction of the magnetic recording medium 1 using the obtained TEM image, the measured values are simply averaged (arithmetically averaged) to obtain the thickness of the magnetic layer 13. Note that the measurement positions are randomly selected from the sample piece.

(Magnetic Powder)

The magnetic powder contains a powder of nanoparticles containing ε-iron oxide (hereinafter, referred to as "ε-iron oxide particles"). The ε-iron oxide particles are capable of achieving a high coercive force even if the ε-iron oxide particles are fine particles. It is favorable that the ε-iron oxide contained in the ε-iron oxide particles is preferentially crystallographically oriented in the thickness direction (perpendicular direction) of the magnetic recording medium 1.

The ε-iron oxide particles have a spherical shape or substantially spherical shape, or a cubic shape or substantially cubic shape. Since the ε-iron oxide particles have the above-mentioned shapes, the area of contact between the particles in the thickness direction of the magnetic recording medium 1 can be reduced, and the aggregation of the particles can be suppressed when ε-iron oxide particles are used as the magnetic particles, as compared with the case where hexagonal plate-shaped barium ferrite particles are used as the magnetic particles. Therefore, it is possible to increase the dispersibility of the magnetic powder and achieve a more favorable SNR (Signal-to-Noise Ratio).

The ε-iron oxide particles have a core-shell structure. Specifically, the ε-iron oxide particles include a core portion, and a shell portion that has a two-layer structure and is provided around the core portion. The shell portion having a two-layer structure includes a first shell portion provided on the core portion, and a second shell portion provided on the first shell portion.

The core portion contains ε-iron oxides. The ε-iron oxide contained in the core portion favorably has ε-$Fe_2O_3$ crystal as the main phase, and has more favorably a single phase of ε-$Fe_2O_3$.

The first shell portion covers at least a part of the periphery of the core portion. Specifically, the first shell portion may partially cover the periphery of the core portion, or may cover the entire periphery of the core portion. From the viewpoint of make exchange coupling of the core portion and the first shell portion sufficient and improving the magnetic properties, the first shell portion favorably covers the entire surface of the core portion.

The first shell portion is a so-called soft magnetic layer, and contains, for example, a soft magnetic material such as α-Fe, a Ni—Fe alloy, or a Fe—Si—Al alloy. α-Fe may be obtained by reducing the ε-iron oxide contained in the core portion.

The second shell portion is an oxide coating film as an oxidation prevention layer. The second shell portion contains α-iron oxide, aluminum oxide, or silicon oxide. The α-iron oxide includes, for example, at least one iron oxide selected from the group consisting of $Fe_3O_4$, $Fe_2O_3$ and FeO. In the case where the first shell portion contains α-Fe (soft magnetic material), the α-iron oxide may be one obtained by oxidizing α-Fe contained in the first shell portion.

Since the ε-iron oxide particles includes first shell portion as described above, the coercive force Hc of the ε-iron oxide particles (core shell particles) as a whole can be adjusted to a coercive force Hc suitable for recording while keeping the coercive force Hc of the core portion alone at a large value in order to ensure high thermal stability. Further, since the ε-iron oxide particles includes the second shell portion as described above, the ε-iron oxide particles are exposed to air and rust or the like is generated on the surfaces of the particles during and before the process of producing the magnetic recording medium, thereby making it possible to suppress the deterioration of the characteristics of the ε-iron oxide particles. Therefore, it is possible to suppress the deterioration of the characteristics of the magnetic recording medium 1.

The average particle size (average maximum particle size) of the magnetic powder is favorably 22 nm or less, more favorably 8 nm or more and 22 nm or less, and still more favorably 12 nm or more and 22 nm or less.

The average aspect ratio of the magnetic powder is favorably 1 or more and 2.5 or less, more favorably 1 or more and 2.1 or less, and still more favorably 1 or more and 1.8 or less. When The average aspect ratio of the magnetic powder is within the range of 1 or more and 2.5 or less, aggregation of the magnetic powder can be suppressed, and the resistance applied to the magnetic powder when the magnetic powder is perpendicularly oriented in the process of forming the magnetic layer 13 can be suppressed. Therefore, the perpendicular orientation of the magnetic powder can be improved.

The average volume (particle volume) Vave of the magnetic powder is favorably 2,300 nm$^3$ or less, more favorably 2,200 nm$^3$ or less, more favorably 2,100 nm$^3$ or less, more favorably 1,950 nm$^3$ or less, more favorably 1,600 nm$^3$ or less, and still more favorably 1,300 nm$^3$ or less. When the average volume Vave of the magnetic powder is 2,300 nm$^3$ or less, the peak of the reproduced waveform of the data signal can be sharpened by narrowing the full width at half maximum of the isolated waveform in the reproduced waveform of the data signal (to 185 nm or less). As a result, the accuracy of reading the data signal is improved, and thus, it is possible to increase the number of recording tracks to improve the recording density of data (as will be described in detail below). Note that the smaller the average volume Vave of the magnetic powder, the better. Thus, the lower limit value of the volume is not particularly limited. However, for example, the lower limit value is 1000 nm$^3$ or more.

The average particle size, the average aspect ratio, and the average volume Vave of the above-mentioned magnetic powder are obtained as follows (e.g., in the case where the magnetic powder has a shape such as a spherical shape as in the ε-iron oxide particles). First, the magnetic recording medium 1 to be measured is processed by the FIB (Focused Ion Beam) method or the like to prepare a slice, and the cross-section of the slice is observed by TEM. Next, 50 magnetic powders are randomly selected from the obtained TEM photograph, and a major axis length DL and a minor axis length DS of each of the magnetic powder are measured. Here, the major axis length DL means the largest one (so-called maximum Feret diameter) of the distances between two parallel lines drawn from all angles so as to be in contact with the contour of the magnetic powder. Meanwhile, the minor axis length DS means the largest one of the lengths of the magnetic powder in a direction perpendicular to the major axis of the magnetic powder.

Subsequently, the measured major axis lengths DL of the 50 magnetic powders are simply averaged (arithmetically averaged) to obtain an average major axis length DLave. Then, the average major axis length DLave obtained in this manner is used as the average particle size of the magnetic powder. Further, the measured minor axis lengths DS of the 50 magnetic powders are simply averaged (arithmetically averaged) to obtain an average minor axis length DSave. Next, an average aspect ratio (DLave/DSave) of the magnetic powder is obtained on the basis of the average major axis length DLave and the average minor axis length DSave.

Next, an average volume (particle volume) Vave of the magnetic powder is obtained from the following formula by using the average major axis length DLave.

$$Vave = \pi/6 \times DLave^3$$

In this description, the case where the ε-iron oxide particles include a shell portion having a two-layer structure has been described. However, the ε-iron oxide particles may include a shell portion having a single-layer structure. In this case, the shell portion has a configuration similar to that of the first shell portion. However, from the viewpoint of suppressing the characteristic deterioration of the ε-iron oxide particles, it is favorable that the ε-iron oxide particles include a shell portion having a two-layer structure as described above.

In the above description, the case where the ε-iron oxide particles have a core-shell structure has been described. However, the ε-iron oxide particles may contain an additive instead of the core-shell structure, or may contain an additive while having a core-shell structure. In this case, some Fe of the ε-iron oxide particles are substituted by the additives. Also by causing the ε-iron oxide particles to contain an additive, the coercive force Hc of the ε-iron oxide particles as a whole can be adjusted to a coercive force Hc suitable for recording, and thus, the ease of recording can be improved. The additive is a metal element other than iron, favorably, a trivalent metal element, more favorably at least one of Al, Ga, or In, and still more favorably at least one of Al or Ga.

Specifically, the ε-iron oxide containing the additive is ε-$Fe_{2-x}M_xO_3$ crystal (However, M represents a metal element other than iron, favorably a trivalent metal element, more favorably at least one of Al, Ga or In, and still more favorably at least one of Al or Ga. x satisfies the following formula represented by: 0<x<1, for example).

The magnetic powder may contain a powder of nanoparticles (hereinafter, referred to as "hexagonal ferrite particles") containing hexagonal ferrite. The hexagonal ferrite particles have, for example, a hexagonal plate shape or a substantially hexagonal plate shape. The hexagonal ferrite favorably contains at least one of Ba, Sr, Pb, or Ca, more favorably at least one of Ba or Sr. The hexagonal ferrite may specifically be, for example, barium ferrite or strontium ferrite. Barium ferrite may further contain at least one of Sr, Pb, or Ca, in addition to Ba. Strontium ferrite may further contain at least one of Ba, Pb, or Ca, in addition to Sr.

More specifically, the hexagonal ferrite has an average composition represented by the following general formula represented by: $MFe_{12}O_{19}$. However, M represents, for example, at least one metal selected from the group consisting of Ba, Sr, Pb, and Ca, favorably at least one metal selected from the group consisting of Ba and Sr. M may represent a combination of Ba and one or more metals selected from the group consisting of Sr, Pb, and Ca. Further, M may represent a combination of Sr and one or more metals selected from the group consisting of Ba, Pb, and Ca.

In the above-mentioned general formula, some Fe may be substituted by other metal elements.

In the case where the magnetic powder contains a powder of hexagonal ferrite particles, the average particle size of the magnetic powder is favorably 50 nm or less, more favorably 10 nm or more and 40 nm or less, and still more favorably 15 nm or more and 30 nm or less. In the case where the magnetic powder contains a powder of hexagonal ferrite particles, the average aspect ratio of the magnetic powder and the average volume Vave of the magnetic powder are as described above.

Note that the average particle size, the average aspect ratio, and the average volume Vave of the magnetic powder are obtained as follows (e.g., in the case where the magnetic powder has a plate-like shape as in hexagonal ferrite). First, the magnetic recording medium 1 to be measured is processed by the FIB method or the like to produce a slice, and the cross-section of the slice is observed by TEM. Next, 50 magnetic powders oriented at an angle of 75 degrees or more with respect to the horizontal direction are randomly selected from the obtained TEM photograph, and a maximum plate thickness DA of each magnetic powder is measured. Subsequently, the measured maximum plate thicknesses DA of the 50 magnetic powders are simply averaged (arithmetically averaged) to obtain an average maximum plate thickness DAave.

Next, the surface of the magnetic layer 13 of the magnetic recording medium 1 is observed by TEM. Next, 50 magnetic powders are randomly selected from the obtained TEM photograph, and a maximum plate diameter DB of each magnetic powder is measured. Here, the maximum plate diameter DB means the largest one (so-called maximum Feret diameter) of the distances between two parallel lines drawn from all angles so as to be in contact with the contour of the magnetic powder. Subsequently, the measured maximum plate diameters DB of the 50 magnetic powders are simply averaged (arithmetically averaged) to obtain an average maximum plate diameter DBave. Then, the average maximum plate diameter DBave obtained in this manner is used as the average particle size of the magnetic powder. Next, an average aspect ratio (DBave/DAave) of the magnetic powder is obtained on the basis of the average maximum plate thickness DAave and the average maximum plate diameter DBave.

Next, using the average maximum plate thickness DAave and the average maximum plate diameter DBave, an average volume (particle volume) Vave of the magnetic powder is obtained from the following formula.

$$Vave = 3\sqrt{3}/8 \times DAave \times DBave^2$$

The magnetic powder may contain a powder of nanoparticles (hereinafter, referred to as "cobalt ferrite particles") containing Co-containing spinel ferrite. The cobalt ferrite particles favorably have uniaxial anisotropy. The cobalt ferrite particles have, for example, a cubic shape or a substantially cubic shape. The Co-containing spinel ferrite may further contain at least one of Ni, Mn, Al, Cu, or Zn, in addition to Co.

The Co-containing spinel ferrite has, for example, the average composition represented by the following formula (1).

$$Co_xM_yFe_2O_z \qquad (1)$$

(However, in the formula (1), M represents, for example, at least one metal selected from the group consisting of Ni, Mn, Al, Cu, and Zn. X represents a value within the range of $0.4 \leq x \leq 1.0$. y represents a value within the range of $0 \leq y \leq 0.3$. However, x and y satisfies the relationship of $(x+y) \leq 1.0$. z represents a value within the range of $3 \leq z \leq 4$. Some Fe may be substituted by other metal elements.)

In the case where the magnetic powder contains a powder of cobalt ferrite particles, the average particle size of the magnetic powder is favorably 25 nm or less, more favorably 23 nm or less. In the case where the magnetic powder contains a powder of cobalt ferrite particles, the average aspect ratio of the magnetic powder is determined by the method described above, and the average volume Vave of the magnetic powder is determined by the method shown below.

Note that in the case where the magnetic powder has a cubic shape as in cobalt ferrite particles, the average volume (particle volume) Vave of the magnetic powder can be obtained as follows. First, the surface of the magnetic layer 13 of the magnetic recording medium 1 is observed by TEM. Next, 50 magnetic powders are randomly selected from the obtained TEM photograph, and a side length DC of each of the magnetic powders is measured. Subsequently, the measured side lengths DC of the 50 magnetic powders are simply averaged (arithmetically averaged) to obtain an average side length DCave. Next, using the average side length DCave, the average volume (particle volume) Vave of the magnetic powder is obtained from the following formula.

$$Vave = DCave^3$$

(Binder)

As the binder, a resin having a structure in which a crosslinking reaction is imparted to a polyurethane resin, a vinyl chloride resin, or the like is favorable. However, the binder is not limited thereto. Other resins may be appropriately blended depending on the physical properties and the like required for the magnetic recording medium 1. The resin to be blended is not particularly limited as long as it is a resin commonly used in the coating-type magnetic recording medium 1.

Examples of the resin include polyvinyl chloride, polyvinyl acetate, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinyl chloride-vinylidene chloride copolymer, a vinyl chloride-acrylonitrile copolymer, an acrylic ester-acrylonitrile copolymer, an acrylic ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, nitrocellulose), a styrene butadiene copolymer, a polyester resin, an amino resin, and synthetic rubber.

Further, examples of the thermosetting resin or the reactive resin include a phenol resin, an epoxy resin, a urea resin, a melamine resin, an alkyd resin, a silicone resin, a polyamine resin, and a urea formaldehyde resin.

Further, a polar functional group such as $-SO_3M$, $-OSO_3M$, $-COOM$, and $P=O(OM)_2$ may be introduced into the above-mentioned binders for the purpose of improving dispersibility of the magnetic powder. Here, M in the formula represents a hydrogen atom, or an alkali metal such as lithium, potassium, and sodium.

Further, examples of the polar functional groups include those of the side chain type having the terminal group of —NR1R2 or —NR1R2R3$^+$X$^-$ and those of the main chain type having >NR1R2$^+$X$^-$. Here, R1, R2, and R3 in the formula each represent a hydrogen atom or a hydrocarbon group, and X$^-$ represents a halogen element ion such as fluorine, chlorine, bromine, and iodine, or an inorganic or organic ion. Further, examples of the polar functional groups include also —OH, —SH, —CN, and an epoxy group.

(Lubricant)

It is favorable that the lubricant contains a compound represented by the following general formula (1) and a compound represented by the following general formula (2). In the case where the lubricant contains these compounds, it is possible to particularly reduce the dynamic friction coefficient of the surface of the magnetic layer 13. Therefore, it is possible to further improve the travelling property of the magnetic recording medium 1.

$$CH_3(CH_2)_n COOH \qquad (1)$$

(However, in the general formula (1), n represents an integer selected from the range of 14 or more and 22 or less)

$$CH_3(CH_2)_p COO(CH_2)_q CH_3 \qquad (2)$$

(However, in the general formula (2), p represents an integer selected from the range of 14 or more and 22 or less, and q represents an integer selected from the range of 2 or more and 5 or less.)

(Additive)

The magnetic layer 13 may further contain, as non-magnetic reinforcing particles, aluminum oxide (α, β, or γ alumina), chromium oxide, silicon oxide, diamond, garnet, emery, boron nitride, titanium carbide, silicon carbide, titanium carbide, titanium oxide (rutile-type or anatase-type titanium oxide), or the like.

[Non-Magnetic Layer 12]

The non-magnetic layer 12 contains a non-magnetic powder and a binder. The non-magnetic layer 12 may contain, as necessary, an additive such as conductive particles, a lubricant, a curing agent, and a rust inhibitor.

The thickness of the non-magnetic layer 12 is favorably 0.6 μm or more and 2.0 μm or less, more favorably 0.8 μm or more and 1.4 μm or less. The thickness of the non-magnetic layer 12 can be obtained by a method similar to the method of obtaining the thickness of the magnetic layer 13 (e.g., TEM). Note that the magnification of the TEM image is appropriately adjusted in accordance with the thickness of the non-magnetic layer 12.

(Non-Magnetic Powder)

The non-magnetic powder includes, for example, at least one of an inorganic particle powder or an organic particle powder. Further, the non-magnetic powder may contain a carbon material such as carbon black. Note that one type of non-magnetic powder may be used alone, or two or more types of non-magnetic powders may be used in combination. The inorganic particles include, for example, a metal, a metal oxide, a metal carbonate, a metal sulfate, a metal nitride, a metal carbide, or a metal sulfide. Examples of the shape of the non-magnetic powder include, but not limited to, various shapes such as a needle shape, a spherical shape, a cubic shape, and a plate shape.

(Binder)

The binder is similar to that in the magnetic layer 13 described above.

[Back Layer 14]

The back layer 14 contains a non-magnetic powder and a binder. The back layer 14 may contain, as necessary, an additive such as a lubricant, a curing agent, and an antistatic agent. As the non-magnetic powder and the binder, materials similar to those used in the above-mentioned non-magnetic layer 12 are used.

(Non-Magnetic Powder)

The average particle size of the non-magnetic powder is favorably 10 nm or more and 150 nm or less, more favorably 15 nm or more and 110 nm or less. The average particle size of the magnetic powder is obtained in a way similar to that for the average particle size D of the above-mentioned magnetic powder. The non-magnetic powder may include a non-magnetic powder having two or more particle size distributions.

The upper limit value of the average thickness of the back layer 14 is favorably 0.6 μm or less. When the upper limit value of the average thickness of the back layer 14 is 0.6 μm or less, the thicknesses of the non-magnetic layer 12 and the base material 11 can be kept thick even in the case where the average thickness of the magnetic recording medium 1 is 5.6 μm, so that the traveling stability of the magnetic recording medium 1 in a recording/reproduction device can be maintained. The lower limit value of the average thickness of the back layer 14 is not particularly limited, but is, for example, 0.2 μm or more.

The average thickness of the back layer 14 is obtained as follows. First, the magnetic recording medium 1 having a ½ inch width is prepared and cut into a length of 250 mm to prepare a sample. Next, using a laser hologage manufactured by Mitsutoyo again as a measuring device, the thickness of the sample is measured at five or more points, and the measured values are simply averaged (arithmetically averaged) to calculate an average value $t_T$ [μm] of the magnetic recording medium 1. Note that the measurement positions are randomly selected from the sample. Subsequently, the back layer 14 of the sample is removed with a solvent such as MEK (methyl ethyl ketone) and dilute hydrochloric acid. After that, the thickness of the sample is measured at five or more points using the above-mentioned laser hologage, and the measured values are simply averaged (arithmetically averaged) to calculate an average value $t_B$ [μm] of the magnetic recording medium 1 from which the back layer 14 has been removed. Note that the measurement positions are randomly selected from the sample. After that, an average thickness $t_b$ [μm] of the back layer 14 is obtained from the following formula.

$$t_b[\mu m] = t_T[\mu m] - t_B[\mu m]$$

The back layer 14 has a surface in which a large number of protrusions are provided. The large number of protrusions are for forming a large number of holes in the surface of the magnetic layer 13 in the state where the magnetic recording medium 1 is wound in a roll shape. The large number of holes include, for example, a large number of non-magnetic particles protruding from the surface of the back layer 14.

In this description, the case where a large number of protrusions provided in the surface of the back layer 14 are transferred to the surface of the magnetic layer 13 to form a large number of holes in the surface of the magnetic layer 13 has been described. However, the method of forming a large number of holes is not limited thereto. For example, a large number of holes may be formed in the surface of the magnetic layer 13 by adjusting the type of solvent contained in the coating material for forming a magnetic layer and the drying condition of the coating material for forming a magnetic layer.

[Average Thickness of Magnetic Recording Medium]

The upper limit value of the average thickness (average total thickness) of the magnetic recording medium 1 is favorably 5.6 μm or less, more favorably 5.0 μm or less, more favorably 4.6 μm or less, and still more favorably 4.4 μm. When the average thickness of the magnetic recording medium 1 is 5.6 μm or less, the recording capacity in the cartridge 21 can be made higher than that in a general magnetic recording medium. The lower limit value of the average thickness of the magnetic recording medium 1 is not particularly limited, but is, for example, 3.5 μm or more.

The average thickness of the magnetic recording medium 1 is obtained by the procedure described in the above-mentioned method of obtaining the average thickness of the back layer 14.

(Coercive Force Hc)

The upper limit value of the coercive force Hc in longitudinal direction of the magnetic recording medium 1 is favorably 2,000 Oe or less, more favorably 1,900 Oe or less, and still more favorably 1,800 Oe or less.

In the case where the lower limit value of the coercive force Hc measured in the longitudinal direction of the magnetic recording medium 1 is favorably 1,000 Oe or more, demagnetization due to leakage flux from the recording head can be suppressed.

The above-mentioned coercive force Hc is obtained as follows. First, three magnetic recording mediums 1 are stacked on top of each other with double-sided tapes, and then punched out by a φ6.39 mm punch to create a measurement sample. Then, the M-H loop of the measurement sample (the entire magnetic recording medium 1) corresponding to the longitudinal direction of the magnetic recording medium 1 (the traveling direction of the magnetic recording medium 1) is measured using a vibrating sample magnetometer (VSM). Next, acetone, ethanol, or the like is used to wipe off the coating film (the non-magnetic layer 12, the magnetic layer 13, the back layer 14, and the like), leaving only the base material 11. Then, the obtained three base materials 11 are stacked on top of each other with double-sided tapes, and then punched out by a φ6.39 mm punch to obtain a sample for background correction (hereinafter, referred to simply as a sample for correction). Then, the VSM is used to measure the M-H loop of the sample for correction (the base material 11) corresponding to the longitudinal direction of the base material 11 (the traveling direction of the magnetic recording medium 1).

In the measurement of the M-H loop of the measurement sample (entire magnetic recording medium 1) and the M-H loop of the sample for correction (the base material 11), a high sensitivity vibrating sample magnetometer "VSM-P7-15 type" manufactured by TOEI INDUSTRIAL CO., LTD. is used. The measurement conditions are as follows. Measurement mode: full loop, maximum magnetic field: 15 kOe, magnetic field step: 40 bit, Time constant of Locking amp: 0.3 sec, Waiting time: 1 sec, MH averaging number: 20.

After two M-H loops are obtained, the M-H loop of the sample for correction (the base material 11) is subtracted from the M-H loop of the measurement sample (entire magnetic recording medium 1) to perform background correction, and the M-H loop after the background correction is obtained. The measurement/analysis program attached to the "VSM-P7-15 type" is used to calculate the background correction.

The coercive force Hc is obtained from the obtained M-H loop after the background correction. Note that for this calculation, the measurement/analysis program attached to the "VSM-P7-15 type" is used. Note that the above-mentioned measurement of the M-H loop is performed at 25° C. Further, "demagnetizing field correction" when measuring the M-H loop in the longitudinal direction of the magnetic recording medium 1 is not performed.

(Degree of Orientation (Squareness Ratio))

The degree of orientation (degree of perpendicular orientation) in the perpendicular direction (thickness direction) of the magnetic recording medium 1 is 65% or more, favorably 70% or more, more favorably 75% or more, and more favorably 80% or more. When the degree of perpendicular orientation is 65% or more, the perpendicular orientation of the magnetic powder becomes sufficiently high, so that a more excellent SNR can be obtained.

The degree of perpendicular orientation is obtained as follows. First, three magnetic recording mediums 1 are stacked on top of each other with double-sided tapes, and then punched out by a φ6.39 mm punch to create a measurement sample. Then, the VSM is used to measure the M-H loop of the measurement sample (the entire magnetic recording medium 1) corresponding to the perpendicular direction (the thickness direction) of the magnetic recording medium 1. Next, acetone, ethanol, or the like is used to wipe off the coating film (the non-magnetic layer 12, the magnetic layer 13, the back layer 14, and the like), leaving only the base material 11. Then, the obtained three base materials 11 are stacked on top of each other with double-sided tapes, and then punched out by a φ6.39 mm punch to obtain a sample for background correction (hereinafter, referred to simply as a sample for correction). Then, the VSM is used to measure the M-H loop of the sample for correction (the base material 11) corresponding to the perpendicular direction of the base material 11 (the perpendicular direction of the magnetic recording medium 1).

In the measurement of the M-H loop of the measurement sample (entire magnetic recording medium 1) and the M-H loop of the sample for correction (the base material 11), a high sensitivity vibrating sample magnetometer "VSM-P7-15 type" manufactured by TOEI INDUSTRIAL CO., LTD. is used. The measurement conditions are as follows. Measurement mode: full loop, maximum magnetic field: 15 kOe, magnetic field step: 40 bit, Time constant of Locking amp: 0.3 sec, Waiting time: 1 sec, MH averaging number: 20.

After two M-H loops are obtained, the M-H loop of the sample for correction (the base material 11) is subtracted from the M-H loop of the measurement sample (entire magnetic recording medium 1) to perform background correction, and the M-H loop after the background correction is obtained. The measurement/analysis program attached to the "VSM-P7-15 type" is used to calculate the background correction.

The saturation magnetization Ms (emu) and residual magnetization Mr (emu) of the obtained M-H loop after the background correction are substituted into the following formula to calculate the degree of perpendicular orientation (%). Note that the above-mentioned measurement of the M-H loop is performed at 25° C. Further, "demagnetizing field correction" when measuring the M-H loop in the perpendicular direction of the magnetic recording medium 1 is not performed. Note that for this calculation, the measurement/analysis program attached to the "VSM-P7-15 type" is used.

Degree of perpendicular orientation (%)=(Mr/Ms)×100

The degree of orientation (degree of longitudinal orientation) in the longitudinal direction (traveling direction) of the magnetic recording medium 1 is favorably 35% or less, more favorably 30% or less, and still more favorably 25% or less. When the degree of longitudinal orientation is 35% or less, the perpendicular orientation of the magnetic powder becomes sufficiently high, so that a more excellent SNR can be obtained.

The degree of longitudinal orientation is determined in a manner similar to that for the degree of perpendicular orientation except that the M-H loop is measured in the longitudinal direction (traveling direction) of the magnetic recording medium 1 and the base material 11.

(Dynamic Friction Coefficient)

In the case where a ratio $(\mu_B/\mu_A)$ of a dynamic friction coefficient $\mu_B$ between the surface of the magnetic layer 13 and the magnetic head when the tension applied to the magnetic recording medium 1 is 0.4 N to a dynamic frictional coefficients $\mu_A$ between the surface of the magnetic layer 13 and the magnetic head when the tension applied to the magnetic recording medium 1 is 1.2 N is favorably 1.0 or more and 2.0 or less, the change in friction coefficient due to the tension fluctuation during travelling can be reduced, and thus, it is possible to stabilize the travelling of the tape.

In the case where a ratio $(\mu_{1000}/\mu_5)$ of a value $\mu_{1000}$ at the 1000-th traveling to a value $\mu_5$ at the fifth traveling of the dynamic friction coefficient $\mu_A$ between the surface of the magnetic layer 13 and the magnetic head when the tension applied to the magnetic recording medium 1 is 0.6 N is favorably 1.0 or more and 2.0 or less, more favorably 1.0 or more and 1.5 or less. In the case where the ratio $(\mu_B/\mu_A)$ is 1.0 or more and 2.0 or less, the change in friction coefficient due to a large number of times of traveling can be reduced, and thus, the traveling of the tape can be stabilized.

[Data Band and Servo Band]

FIG. 2 is a schematic diagram of the magnetic recording medium 1 as viewed from above. Referring to FIG. 2, the magnetic layer 13 includes a plurality of data bands d (data bands d0 to d3) long in the longitudinal direction (X-axis direction) in which a data signal is written, and a plurality of servo bands s (servo bands s0 to s4) long in the longitudinal direction in which a servo signal is written). The servo bands s are located at positions where the respective data bands d are sandwiched in the width direction (Y-axis direction).

In the present technology, the ratio of the area of the servo bands s to the area of the entire surface of the magnetic layer 13 is typically set to 4.0% or less. Note that the width of the servo band s is typically set to 95 µm or less. The ratio of the area of the servo bands s to the area of the entire surface of the magnetic layer 13 can be measured by, for example, developing the magnetic recording medium 1 using a developer such as a ferricolloid developer and then observing the developed magnetic recording medium 1 under an optical microscope.

Since the servo bands s are located at positions where the respective data bands d are sandwiched, the number of servo bands s is one more than the number of data bands d. In the example shown in FIG. 2, an example in which the number of data bands d is four and the number of servo bands s is five is shown (In existing systems, it is common to employ this approach).

Note that the number of data bands d and the number of servo bands s can be changed as appropriate, and these numbers may be increased.

In this case, the number of servo bands s is favorably five or more. When the number of servo bands s is five or more, it is possible to ensure stable recording/reproduction characteristics with less off-track by suppressing the effect of dimensional changes of the magnetic recording medium 1 in the width direction on the accuracy of servo signal reading, Further, the number of data bands d may be 8, 12, . . . , (i.e., 4n (n represents an integer greater than or equal to two)) and the number of servo bands s may be 9, 13, . . . (i.e., 4n+1 (n represents an integer greater than or equal to two)). In this case, it is possible to cope with the change of the number of data bands d and the number of servo bands s without changing the existing systems.

The data band d includes a plurality of recording tracks 5 that is long in the longitudinal direction and aligned in the width direction. The data signals are recorded on the recording tracks 5 along the recording tracks 5. Note that in the present technology, the one bit length in the longitudinal direction in the data signal to be recorded on the data band d is typically 48 nm or less. The servo band s includes a servo signal recording pattern 6 of predetermined patterns on which a servo signal is recorded by a servo signal recording device (not shown).

Figure 3:
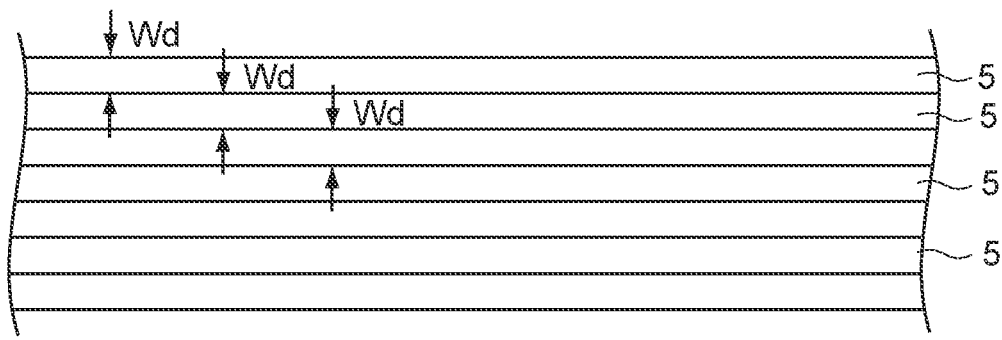
FIG. 3 is an enlarged view showing recording tracks in a data band.

FIG. 3 is an enlarged view showing the recording tracks in the data band d. As shown in FIG. 3, the recording tracks are each long in the longitudinal direction, are aligned in the width direction, and each have a predetermined recording track width Wd for each track in the width direction. This recording track width Wd is set to typically 2.0 µm or less. Note that such a recording track width Wd can be measured by, for example, developing the magnetic recording medium 1 using a developer such as a ferricolloid developer and then observing the developed magnetic recording medium 1 under an optical microscope.

The number of recording tracks included in one data band d is, for example, approximately 1,000 to 2,000.

Figure 4:
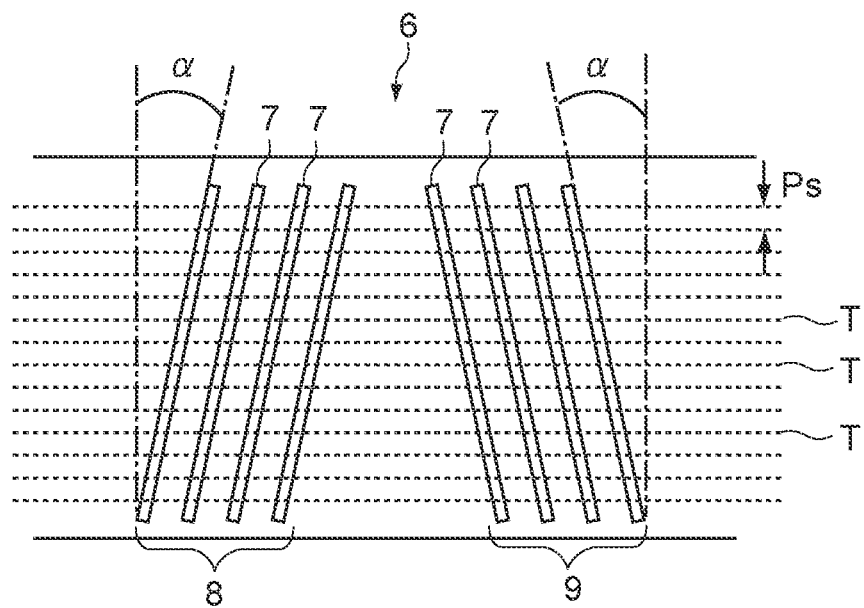
FIG. 4 is an enlarged view showing a servo signal recording pattern in a servo band.

FIG. 4 is an enlarged view showing the servo signal recording pattern 6 in the servo band s. As shown in FIG. 4, the servo signal recording pattern 6 includes a plurality of stripes 7 inclined at a predetermined azimuth angle α with respect to the width direction (Y-axis direction). The plurality of stripes 7 is classified into a first stripe group 8 that is inclined clockwise with respect to the width direction (Y-axis direction) and a second stripe group 9 which is inclined counterclockwise with respect to the width direction. Note that the shape and the like of such a stripe 7 can be measured by, for example, developing the magnetic recording medium 1 using a developer such as a ferricolloid developer and then observing the developed magnetic recording medium 1 under an optical microscope.

In FIG. 4, a servo trace line T, which is a line traced by the servo read head on the servo signal recording pattern 6, is indicated by a broken line. The servo trace line T is set along the longitudinal direction (X-axis direction) and is set at a predetermined interval Ps in the width direction.

The number of servo trace lines T per servo bands is, for example, approximately 30 to 60.

The interval Ps between two adjacent servo trace lines T is the same as the value of the recording track width Wd, and is, for example, 2.0 µm or less. Here, the interval Ps of the two adjacent servo trace lines T is a value that determines the recording track width Wd. That is, when the interval Ps between the servo trace lines T is narrowed, the recording track width Wd becomes smaller, and the number of recording tracks included in one data band d increases. As a result, the recording capacity of data increases (the opposite is true in the case where the interval Ps increases). Therefore, in order to increase the recording capacity, while the recording track width Wd needs to be reduced, the interval Ps of the servo trace line T, is also narrowed. As a result, it is difficult to accurately trace adjacent servo trace lines. In this regard, in this embodiment, it is possible to cope with the narrowing of the recording track width Wd by narrowing the reproduction signal width, i.e., the full width at half maximum of the isolated waveform in the reproduced waveform of the data signal, as will be described below.

<Data Recording Device 20>

Figure 5:
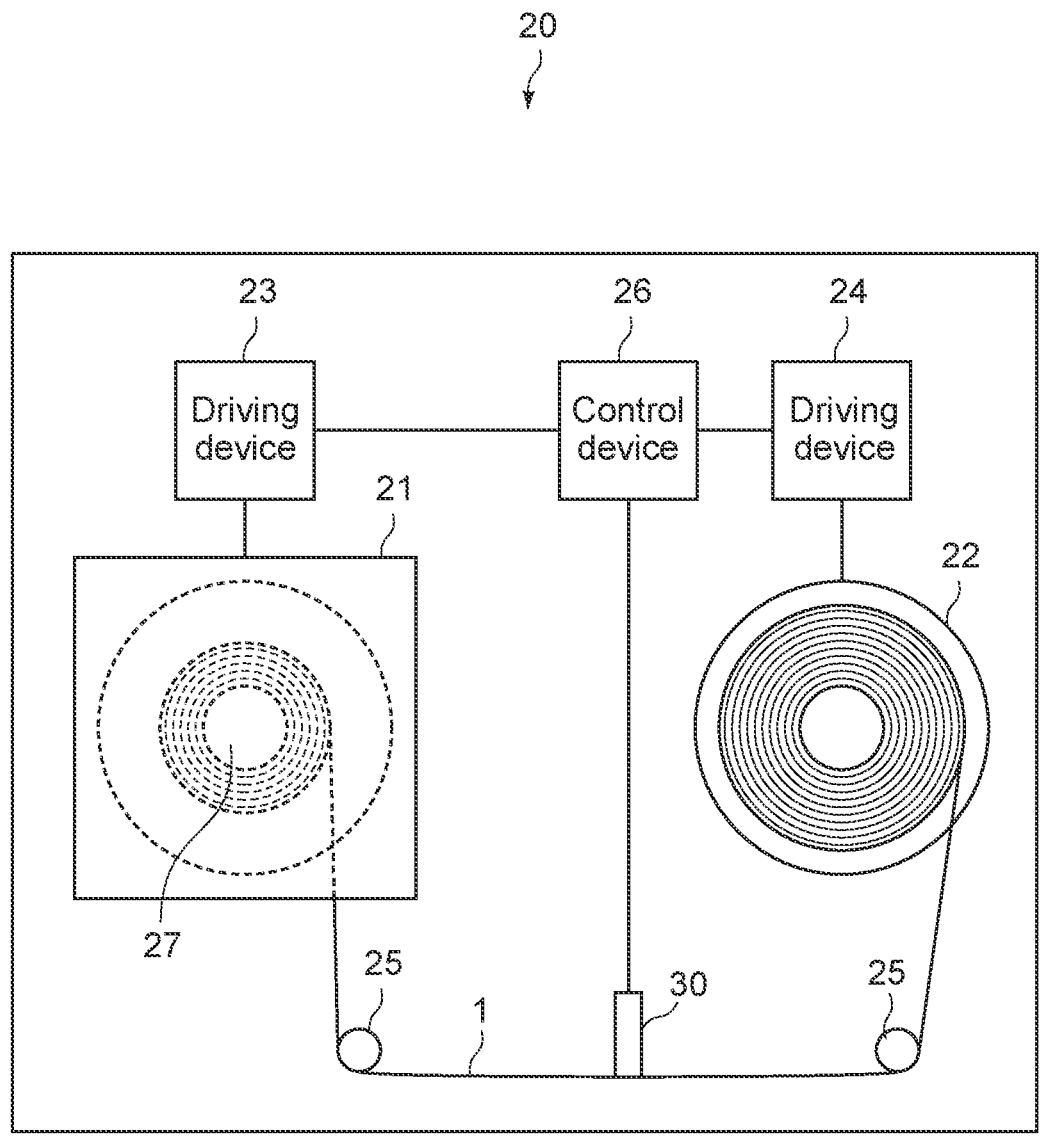
FIG. 5 is

Next, a data recording device 20 for recording/reproducing data signals to/from the magnetic recording medium 1 will be described. FIG. 5 is a schematic diagram showing the data recording device 20. Note that in the present specification (and the drawings), a coordinate system with reference to the data recording device 20 is represented by an X'Y'Z' coordinate system.

The data recording device 20 is configured to be capable of loading the cartridge 21 housing the magnetic recording medium 1. Note that although a case where the data recording device 20 is capable of loading one cartridge 21 will be described here for ease of description, the data recording device 20 may be configured to be capable of loading a plurality of cartridges 21.

As shown in FIG. 5, the data recording device 20 includes a spindle 27, a reel 22, a spindle driving device 23, a reel driving device 24, a plurality of guide rollers 25, a head unit 30, and a control device 26.

The spindle 27 is configured to be capable of loading the cartridge 21. The cartridge 21 complies with the LTO (Linear Tape Open) standard and rotatably houses the wound magnetic recording medium 1 inside the case. The reel 22 is configured to be capable of fixing the leading end of the magnetic recording medium 1 pulled out from the cartridge 21.

The spindle drive device 23 causes the spindle 27 to rotate in response to a command from the control device 26. The reel drive device 24 causes the reel 22 to rotate in response to a command from the control device 26. When data signals are recorded/reproduced on/from the magnetic recording medium 1, the spindle driving device 23 and the reel driving device 24 respectively cause the spindle 27 and the reel 22 to rotate, thereby causing the magnetic recording medium 1 to travel. The guide roller 25 is a roller for guiding the travelling of the magnetic recording medium 1.

The control device 26 includes, for example, a control unit, a storage unit, a communication unit, and the like. The control unit includes, for example, a CPU (Central Processing Unit) and the like, and integrally controls the respective units of the data recording device 20 in accordance with a program stored in the storage unit.

The storage unit includes a non-volatile memory on which various types of data and various programs are to be recorded, and a volatile memory used as a work area of the control unit. The above-mentioned various programs may be read from a portable recording medium such as an optical disk and a semiconductor memory, or may be downloaded from a server device on a network. The communication unit is configured to be capable of communicating with other devices such as a PC (Personal Computer), and a server device.

The head unit 30 is configure to be capable of recording, in response to a command from the control device 26, a data signal to the magnetic recording medium 1. Further, the head unit 30 is configured to be capable of reproducing data written to the magnetic recording medium 1 in response to a command from the control device 26.

Figure 6:
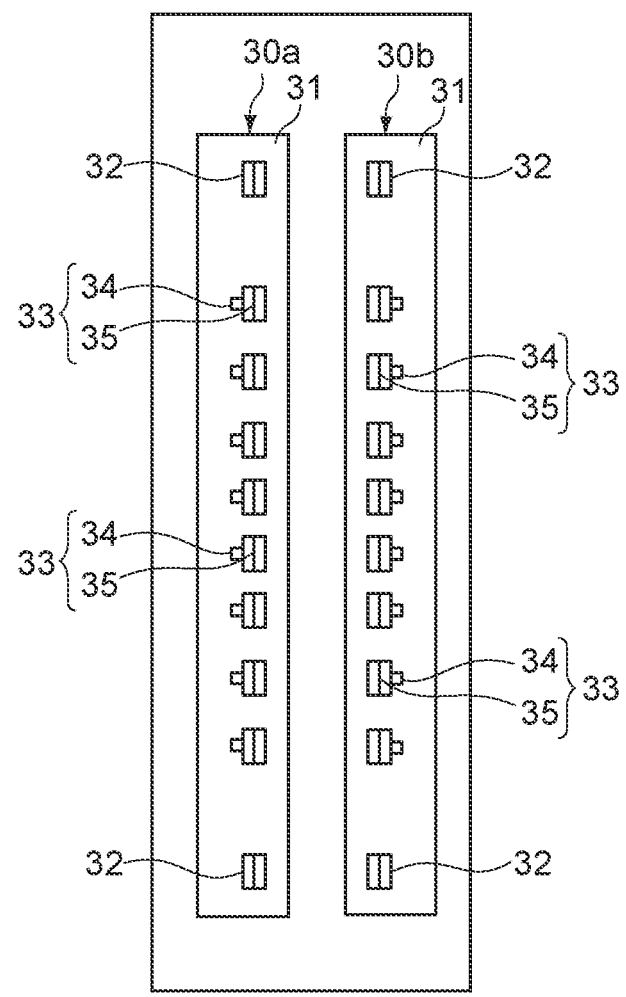
FIG. 6 is a diagram of a head unit as viewed from below.
Figure 6:
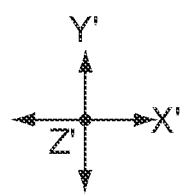

FIG. 6 is a diagram of the head unit 30 as viewed from below. As shown in FIG. 6, the head unit 30 includes a first head unit 30a and a second head unit 30b. The first head unit 30a and the second head unit 30b are configured symmetrically in the X'-axis direction (travelling direction of the magnetic recording medium 1). The first head unit 30a and the second head unit 30b are configured to be movable in the width direction (Y'-axis direction).

The first head unit 30a is a head used when the magnetic recording medium 1 travels in the forward direction (flow direction from the cartridge 21 side to the device 20 side). Meanwhile, the second head unit 30b is a head used when the magnetic recording medium 1 travels in the opposite direction (flow direction from the device 20 side to the cartridge 21 side).

Since the first head unit 30a and the second head unit 30b have basically the same configuration, the first head unit 30a will be typically described.

The first head unit 30a includes a unit body 31, two servo read heads 32, and a plurality of the data write/read heads 33.

A servo read head 32 is configured to be capable of reproducing a servo signal by reading the magnetic flux generated from magnetic information recorded on the magnetic recording medium 1 (servo band s) by an MR device (MR: Magneto Resistive) or the like. That is, the servo read head 32 reads the servo signal recording pattern 6 recorded on the servo band s to reproduce the servo signal. One servo read head 32 is provided on each of both end sides of the width direction (Y'-axis) of the unit body 31. The interval between the two servo read heads 32 in the width direction (Y'-axis direction) is substantially the same as the distance between adjacent servo bands s in the magnetic recording medium 1.

The data write/read heads 33 are disposed along the width direction (Y-axis direction) at equal intervals. Further, the data write/read head 33 is disposed at a position sandwiched between the two servo read heads 32. The number of data write/read heads 33 is, for example, approximately 20 to 40, but is not particularly limited.

The data write/read head 33 includes a data write head 34 and a data read head 35. The data write head 34 is configured to be capable of recording data signals on the magnetic recording medium 1 by a magnetic field generated from a magnetic gap. Further, the data read head 35 is configured to be capable of reproducing a data signal by reading the magnetic field generated from the magnetic information recorded on the magnetic recording medium 1 (data band d) by an MR device (MR: Magneto Resistive) or the like.

In the first head unit 30a, the data write head 34 is disposed on the left side of the data read head 35 (upstream side when the magnetic recording medium 1 flows in the forward direction). Meanwhile, in the second head unit 30b, the data write head 34 is disposed on the right side of the data read head 35 (upstream side when the magnetic recording medium 1 flows in the opposite direction). Note that the data read head 35 is capable of reproducing a data signal immediately after the data write head 34 writes the data signal to the magnetic recording medium 1.

Figure 7:
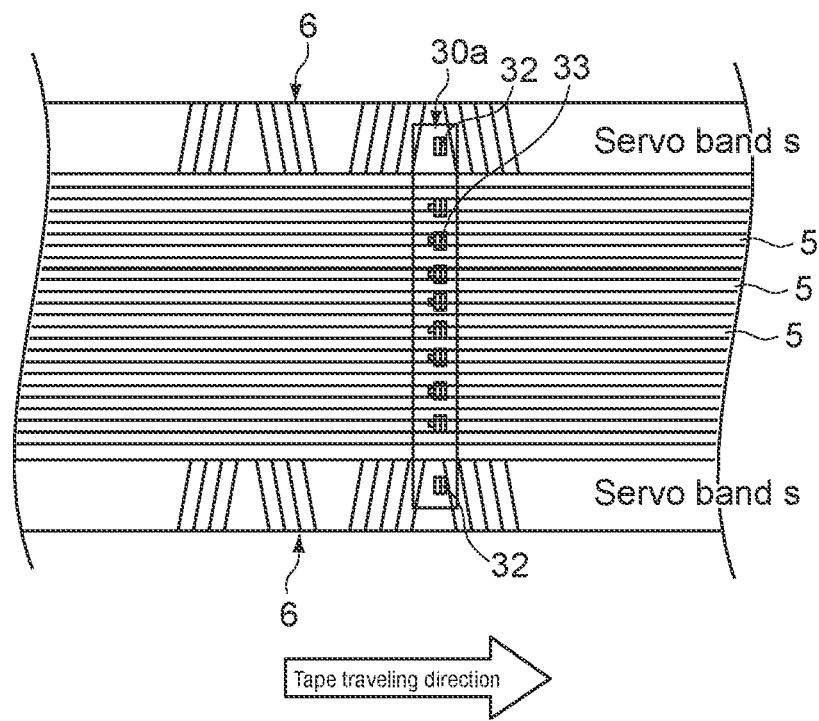
FIG. 7 is a diagram showing the state when a first head unit performs recording/reproduction of a data signal.
Figure 7:
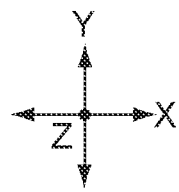

FIG. 7 is a diagram showing the state when the first head unit 30a performs recording/reproduction of a data signal. Note that in the example shown in FIG. 7, a state where the magnetic recording medium 1 is caused to travel in the forward direction (flow direction from the cartridge 21 side to the device 20 side) is shown.

As shown in FIG. 7, when the first head unit 30a records/reproduces a data signal, one of the two servo read heads 32 is located on one of the two adjacent servo bands s and reads the servo signal on this servo band s.

Further, the other of the two servo read heads 32 of is located on the other of the two adjacent servo bands s and reads the servo signal on this servo band s.

Further, at this time, the control device 26 determines, on the basis of the reproduced waveform of the servo signal recording pattern, whether or not the servo read head 32 accurately traces on the target servo trace line T (see FIG. 4).

This principle will be described. As shown in FIG. 4, the first stripe group 8 and the second stripe group 9 in the servo signal recording pattern 6 are inclined in opposite directions with respect to the width direction (Y-axis direction). For this reason, in the upper servo trace line T, the distances between the first stripe group 8 and the second stripe group 9 in the longitudinal direction (X-axis direction) are relatively small. Meanwhile, on the lower servo trace line T, the distances between the first stripe group 8 and the second stripe group 9 the in longitudinal direction (X-axis direction) are relatively wide.

Therefore, by obtaining the difference between the time at which the reproduced waveform of the first stripe group 8 has been detected and the time at which the reproduced waveform of the second stripe group 9 has been detected, the current position of the servo read head 32 in the width direction (Y-axis direction) relative to the magnetic recording medium 1 can be known.

Accordingly, the control device 26 is capable of determining, on the basis of the reproduced waveform of the servo signal, whether or not the servo read head 32 accurately traces on the target servo trace line T. Then, in the case where the servo read head 32 does not accurately trace on the target servo trace line T, the control device 26 adjusts the position of the head unit 30 by causing the head unit 30 to move in the width direction (Y'-axis direction).

Referring to FIG. 7 again, the data write/read head 33 records data signals on the recording tracks along the recording tracks while the position of the data write/read head 33 in the width direction is adjusted (when shifted).

Here, when the magnetic recording medium 1 is completely pulled out of the cartridge 21, then, the magnetic recording medium 1 is caused to travel in the opposite direction (flow direction from the device 20 side to the cartridge 21 side). At this time, the second head unit 30b is used as the head unit 30.

Further, at this time, as the servo trace line T, the servo trace line T adjacent to the previously used servo trace line T is used. In this case, the head unit 30 is caused to move in the width direction (Y'-axis direction) by the amount corresponding to the interval Ps of the servo trace line T (=recording track width Wd).

Further, in this case, the data signal is recorded on the recording track 5 adjacent to the recording track 5 on which the data signal has been previously recorded.

In this way, data signals are recorded on the recording track 5 while the magnetic recording medium 1 is reciprocated many times with the traveling direction thereof being changed between the forward direction and the reverse direction.

Here, for example, assumption is made that the number of servo trace lines T is 50 and the number of data write/read heads 33 included in the first head unit 30a (or the second head unit 30b) is 32. In this case, the number of recording tracks included in one data band d is 50×32, i.e., 1,600. Thus, in order to record data signals in all of the recording tracks 5, the magnetic recording medium 1 needs to be reciprocated 25 times.

<Basic Concept of Present Technology>

Next, a basic idea of the present technology will be described. In the present technology, the full width at half maximum (PW50) of the isolated waveform in the reproduced waveform of the data signal is focused on. First, this full width at half maximum of the isolated waveform will be described.

Figure 8:
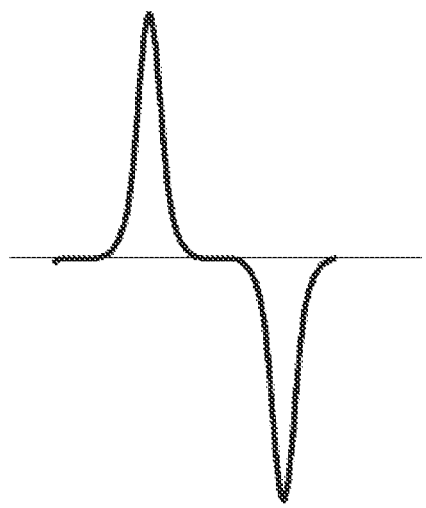
FIG. 8 is a diagram showing a reproduced waveform when reading a data signal recorded on a recording track included in a data band.

FIG. 8 is a diagram showing a reproduced waveform when reading a data signal recorded on a recording track included in the data band d. As shown in FIG. 8, the reproduced waveform when reading the data signal protrudes to the positive and negative sides. The isolated waveform basically refers to any of the waveforms. In FIG. 8, the vertical axis is strength (arbitrary unit) and the horizontal axis is the length along the traveling direction (the same applies to FIG. 9).

Figure 9:
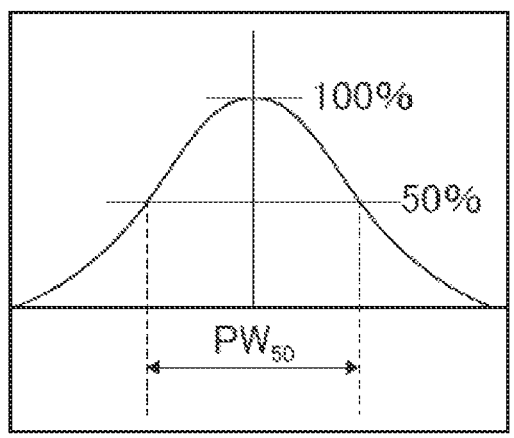
FIG. 9 is a diagram for describing a full width at half maximum in the isolated waveform.

FIG. 9 is a diagram for describing the full width at half maximum in the isolated waveform. As shown in FIG. 9, the full width at half maximum is the width of the waveform at the height of half (50%) of the maximum (100%) in the reproduced waveform of the data signal.

This full width at half maximum is a value representing the sharpness of the peak in the reproduced waveform of the data signal. That is, the narrower the full width at half maximum, the sharper the peak in the reproduced waveform. Conversely, the broader the full width at half maximum, the less the sharpness of the peak in the reproduced waveform.

Figure 10:
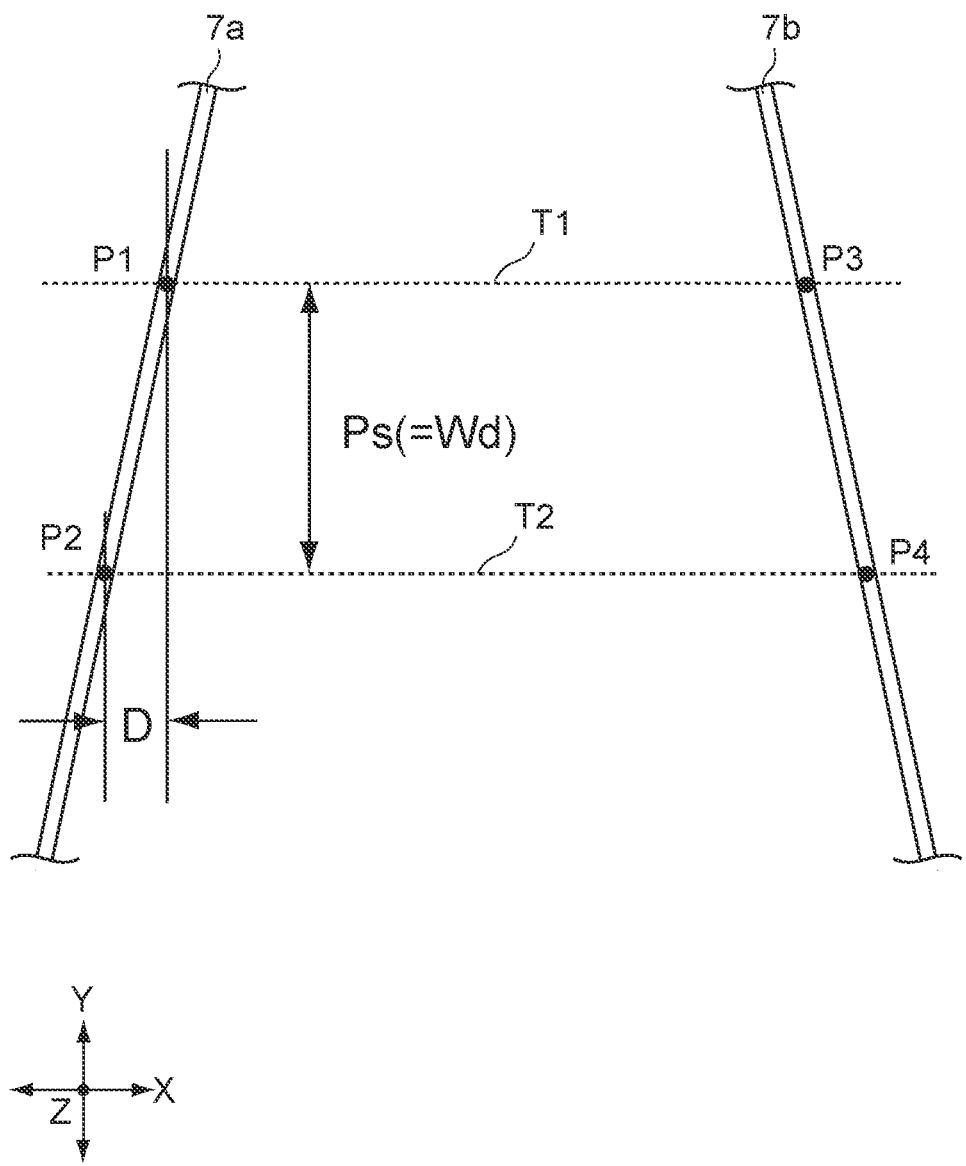
FIG. 10 is a diagram for describing a basic idea of the present technology, and is a diagram showing two stripes in a servo signal recording pattern.

FIG. 10 is a diagram for describing the basic idea of the present technology, and is a diagram showing two stripes 7 in the servo signal recording pattern 6.

Referring to FIG. 10, an arbitrary stripe 7 of the plurality of stripes 7 included in the first stripe group 8 of the servo signal recording pattern 6 is defined as the first stripe 7a. Further, an arbitrary stripe 7 of the plurality of stripes 7 included in the second stripe group 9 of the servo signal recording pattern 6 is defined as the second stripe 7b.

Further, among the plurality of servo trace lines T, an arbitrary servo trace line T is defined as a first servo trace line T1. Further, the servo trace line T adjacent to the first servo trace line T1 is defined as a second servo trace line T2.

The intersection of the first stripe 7a and the first servo trace line T1 is denoted by P1. Note that regarding this point P1, an arbitrary point on the first stripe 7a may be used as the point P1.

The intersection of the first stripe 7a and the second servo trace line T2 is denoted by P2. Note that regarding this point P2, a point on the first stripe 7a located at a position apart from the P1 by the interval Ps (i.e., by the amount corresponding to the recording track width Wd) in the widthwise direction (Y-axis direction) may be used as the point P2.

Further, the distance in the longitudinal direction (X-axis direction) between the points P1 and P2 is defined as a distance D. The distance D corresponds to the deviation in the longitudinal direction from the adjacent track.

Further, the intersection between the second stripe 7b and the first servo trace line T1 is defined as P3, and the intersection between the second stripe 7b and the second servo trace line T2 is defined as P4.

When the first servo trace line T1 is traced, the difference between the time at which the reproduced waveform has been detected at the point P1 and the time at which the reproduced waveform has been detected at the point P3 needs to be determined. This difference is defined as a first period.

Similarly, when the second trace line T is traced, the difference between the time at which the reproduced waveform has been detected at the point P2 and the time at which the reproduced waveform has been detected at the point P4 needs to be determined. This difference is defined as the second period.

Next, a difference between the first period and the second period will be considered. Here, assumption is made that the interval Ps of the servo trace line T and the recording track width Wd are each 1.56 μm and the azimuth angle α is 12 degrees. In this case, the distance D is 1.56×tan 12°, i.e., 0.33 μm. The difference between the distance between the points P1 and P3 and the distance between the points P2 and P4 is twice the distance D, i.e., 0.66 μm.

At this time, assuming that the traveling velocity of the magnetic recording medium 1 is 5 m/s, 0.66/5000000, i.e., 0.13 μs is obtained. This is the difference between the first period and the second period.

That is, in order to accurately trace the first servo trace line T1 and the second servo trace line T2, it is necessary to accurately determine the small difference of 0.13 μs (if this is not possible, the data signal is recorded on the adjacent recording track 5.

However, in the case where the sharpness of the peak of the reproduced waveform (see FIG. 8) of the data signal is dull, such a small difference cannot be accurately determined. In particular, in the case where the recording track width Wd is reduced and the interval Ps between the servo trace lines T is reduced in order to increase the number of recording tracks 5, the distance D is further narrowed and the difference between the first period and the second period is further reduced.

In this regard, in the present technology, the full width at half maximum of the isolated waveform in the reproduced waveform of the data signal is made equal to or lower than a certain value by setting the degree of perpendicular orientation of the magnetic layer 13 to a certain degree or more. This sharpens the peak of the reproduced waveform of the data signal.

More specifically, by setting the degree of perpendicular orientation of the magnetic layer 13 to 65% or more, the full width at half maximum of the isolated waveform can be made equal to or lower than 185 nm or less. As a result, the peak of the reproduced waveform of the data signal can be sharpened to such an extent that the small difference (e.g., 0.13 μs) as described above can be identified (see Examples described below).

<Various Examples and various Comparative Examples>

Next, various Examples and various Comparative Examples in the present technology will be described. The various Examples and various Comparative Examples are shown in Table 1.

TABLE 1

| | Degree of perpendicular orientation % | Degree of longitudinal orientation % | Distance D Recording track width Wd % | Distance D μm | Recording track width Wd μm | Magnetic powder shape Contained element other than Fe | Full width at half maximum of isolated waveform nm |
|---|---|---|---|---|---|---|---|
| Example1 | 65 | 35 | 21.3 | 0.12 | 0.56 | Hexagonal plate Ba | 170 |
| Example2 | 66 | 31 | 21.3 | 0.12 | 0.56 | Hexagonal plate Ba | 150 |
| Example3 | 70 | 29 | 21.3 | 0.12 | 0.56 | Hexagonal plate Ba | 140 |
| Example4 | 71 | 25 | 21.3 | 0.12 | 0.56 | Hexagonal plate Ba | 130 |
| Example5 | 66 | 31 | 44.5 | 0.17 | 0.38 | Hexagonal plate Ba | 150 |
| Example6 | 66 | 31 | 32.5 | 0.17 | 0.52 | Hexagonal plate Ba | 160 |
| Example7 | 66 | 31 | 21.3 | 0.62 | 2.91 | Hexagonal plate Ba | 150 |
| Example8 | 66 | 31 | 21.3 | 0.33 | 1.55 | Hexagonal plate Ba | 150 |
| Example9 | 66 | 31 | 21.3 | 0.12 | 0.56 | Hexagonal plate Ba | 150 |
| Example10 | 66 | 31 | 21.3 | 0.08 | 0.38 | Hexagonal plate Ba | 150 |
| Example11 | 66 | 31 | 21.3 | 0.12 | 0.56 | Hexagonal plate Sr | 150 |
| Example12 | 66 | 31 | 21.3 | 0.12 | 0.56 | Spherical None | 150 |
| Example13 | 66 | 31 | 21.3 | 0.12 | 0.56 | Spherical Ga | 150 |
| Example14 | 66 | 31 | 21.3 | 0.12 | 0.56 | Cubic Co | 150 |
| Comparative Example1 | 55 | 46 | 21.3 | 0.12 | 0.56 | Hexagonal plate Ba | 210 |
| Comparative Example2 | 61 | 40 | 21.3 | 0.12 | 0.56 | Hexagonal plate Ba | 190 |

| | Spherical | Aspect ratio | Particle volume nm3 | Magnetic layer thickness nm | Remarks |
|---|---|---|---|---|---|
| Example1 | Plate | 2.8 | 1950 | 80 | Reference |
| Example2 | Plate | 2.8 | 1950 | 80 | Increased degree of perpendicular orientation |
| Example3 | Plate | 2.8 | 1950 | 80 | Further increased degree of perpendicular orientation |
| Example4 | Plate | 2.8 | 1950 | 80 | Further increased degree of perpendicular orientation |
| Example5 | Plate | 2.8 | 1950 | 80 | Azimuth angle of 24 degrees, differ in recording track width |
| Example6 | Plate | 2.8 | 1950 | 80 | Azimuth angle of 18 degrees, differ in recording track width |
| Example7 | Plate | 2.8 | 1950 | 80 | Differ in recording track width |
| Example8 | Plate | 2.8 | 1950 | 80 | Differ in recording track width |

TABLE 1-continued

| | | | | | |
|---|---|---|---|---|---|
| Example9 | Plate | 2.8 | 1950 | 80 | Differ in recording track width |
| Example10 | Plate | 2.8 | 1950 | 80 | Differ in recording track width |
| Example11 | Plate | 3 | 2000 | 80 | Differ in magnetic particles |
| Example12 | Spherical | 1.1 | 2150 | 80 | Differ in magnetic particles |
| Example13 | Spherical | 1 | 2150 | 80 | Differ in magnetic particles |
| Example14 | Cubic | 1.7 | 2200 | 80 | Differ in magnetic particles |
| Comparative Example1 | Plate | 2.8 | 1950 | 80 | |
| Comparative Example2 | Plate | 2.8 | 1950 | 80 | |

First, the magnetic recording medium 1 according to a First Example is prepared as a reference magnetic recording medium 1. In the other Examples and other Comparative Examples, various values such as the degree of perpendicular orientation were changed with respect to the First Example.

As shown in Table 1, in First Example, the degree of perpendicular orientation of the magnetic layer 13 was set to 65% and the degree of longitudinal orientation of the magnetic layer 13 was set to 35%. Further, in First Example, the ratio (see FIG. 10) of the distance D to the recording track width Wd (the interval Ps of the servo trace line T) was set to 21.3%. Note that this ratio is related to the azimuth angle α (see FIG. 4) and is equal to a value in which tan a is expressed as %. In the First Example, the azimuth angle α was 12°.

Further, in First Example, the distance D (see FIG. 10) was set to 0.12 μm and the recording track width Wd (the interval Ps of the servo trace line T) was set to 0.56 μm. Further, in the First Example, as the magnetic powder contained in the magnetic layer 13, hexagonal plate-shaped barium ferrite was used.

Further, in First Example, the full width at half maximum of the isolated waveform in the reproduced waveform of the data signal was 170 nm. Further, in First Example, the magnetic powder contained in the magnetic layer 13 had a plate shape and the aspect ratio in this magnetic powder was set to 2.8. Further, the particle volume (average volume Vave) of the magnetic powder was a 1950 nm³. Further, the thickness of magnetic layer 13 was 80 nm.

Note that the full width at half maximum of the isolated waveform can be obtained, for example, as follows. First, using a digital-storage oscilloscope, averaging (synchronous summation averaging) of a plurality of isolated waveforms is performed under the conditions of the sampling: 500 Ms/s (2 nsec/point) and the number of samples of 50,000 points, for example. Then, the full width at half maximum of the isolated waveform is calculated from the obtained isolated reproduced waveform. Note that in the synchronous averaging, alignment is performed at the peak position in the waveform.

Further, in the data write head 34 that records a data signal, the recording track width (Y'-axis direction: width direction of the magnetic recording medium) was set to 7 μm, the magnetic gap length (X'-axis direction: longitudinal direction of the magnetic recording medium) was set to 0.2 μm, the number of turns of the coil was set to 12, and the magnetic gap depth was set to 1 μm. A "Large form factor" manufactured by Mountain Engineering II Inc. was used as a traveling device, the tape traveling speed was set to 2 m/s, and the recording signal was a square wave of 0.5 MHz.

Further, as the data read head 35 that reads a data signal, a TMR head including a TMR element (TMR: Tunnel Magneto Resistive) is used. The reproduction track width (Y'-axis direction: width direction of the magnetic recording medium) of the servo signal in this TMR head is 0.5 μm. Further, the spacing (X'-axis direction: conveying direction of the magnetic recording medium) between the two shields in the TMR head used here is 0.1 μm, and the bias current in the TMR head is less than 4 mA, and the element resistance is 77Ω. Further, the conveying velocity of the magnetic recording medium 1 was 2 m/s, and the wrap angle was 1.8°.

In a Second Example, the degree of perpendicular orientation of the magnetic layer 13 was increased to 66% compared to the First Example. Further, the degree of degree of longitudinal orientation of the magnetic layer 13 was reduced to 31%. In Second Example, since the degree of perpendicular orientation of the magnetic layer 13 was made higher than that in First Example (the degree of longitudinal orientation was reduced), the full width at half maximum of the isolated waveform was narrowed to 150 nm, which was narrower than that in First Example. Note that the other points are the same as those in the First Example.

In a Third Example, the degree of perpendicular orientation of the magnetic layer 13 was further increased to 70%, which is higher than that in the Second Example. Further, the degree of degree of longitudinal orientation of the magnetic layer 13 was further reduced to 29%. In Third Example, since the degree of perpendicular orientation of the magnetic layer 13 was made higher than that in Second Example (the degree of longitudinal orientation was further reduced), the full width at half maximum of the isolated waveform was narrowed to 140 nm, which was narrower than that in Second Example. Note that the other points are the same as those in the First Example.

In a Fourth Example, the degree of perpendicular orientation of the magnetic layer 13 was further increased to 71%, which is higher than that in the Third Example. Further, the degree of degree of longitudinal orientation of the magnetic layer 13 was further reduced to 25%. In Fourth Example, since the degree of perpendicular orientation of the magnetic layer 13 was made higher than that in Third Example (the degree of longitudinal orientation was further reduced), the full width at half maximum of the isolated waveform was narrowed to 130 nm, which was narrower than that in Third Example. Note that the other points are the same as those in the First Example.

In a Fifth Example, the degree of perpendicular orientation of the magnetic layer 13 was 66% and the degree of degree of longitudinal orientation of the magnetic layer 13 was 31%. Note that the degree of perpendicular orientation and the degree of longitudinal orientation in Fifth Example to Fourteenth Example are the same as those in Second Example.

Further, in Fifth Example, the azimuth angle α (see FIG. 4) of the servo signal recording pattern 6 is different from those in First Example to Fourth Example, and the azimuth angle α is 24 degrees. For this reason, in Fifth Example, the distance D (see FIG. 10) is different from those in First Example to Fourth Example and is 0.17 μm. Further, in the fifth embodiment, the ratio (see FIG. 10) of the distance D to the recording track width Wd (the interval Ps of the servo trace line T) is different from those in First Example to Fourth Example and is 44.5%.

In Fifth Example, since the degree of perpendicular orientation and the degree of longitudinal orientation were the same as those in Second Example, the full width at half maximum of the isolated waveform was 150 nm in the data read head employed at this time. The other points are the same as those in the First Example.

In Sixth Example, the degree of perpendicular orientation of the magnetic layer 13 was set to 66%, and the degree of longitudinal orientation of the magnetic layer 13 was set to 31%. Further, in Sixth Example, the azimuth angle α (see FIG. 4) of the servo signal recording pattern 6 is different from those in First Example to Fifth Example, and the azimuth angle α is 18 degrees.

For this reason, in Sixth Example, the ratio (see FIG. 10) of the distance D to the recording track width Wd (the interval Ps of the servo trace line T) is different from those in First Example to Fifth Example and is 32.5%.

Further, in Sixth Example, also the recording track width Wd (the interval Ps of the servo trace line T) is different from those in First Example to Fifth Example and is 0.52 μm. Further, in Sixth Example, the distance D (see FIG. 10) was set to 0.17 μm. Then, in Sixth Example, the full width at half maximum of the isolated waveform was 160 μm.

In Seventh Example to Tenth Example, the recording track width Wd (the interval Ps of the servo trace line T) is changed using the magnetic recording medium 1 that is the same as the magnetic recording medium 1 used in Second Example. Specifically, in Seventh Example, the recording track width Wd (the interval Ps of the servo trace line T) was set to 2.91 μm and the distance D was set to 0.62 μm.

Further, in Eighth Example, the recording track width Wd (the interval Ps of the servo trace line T) was set to 1.55 μm and the distance D was set to 0.33 μm. Further, in Ninth Example, the recording track width Wd (the interval Ps of the servo trace line T) was set to 0.56 μm and the distance D was set to 0.12 μm. Further, in Tenth Example, the recording track width Wd (the interval Ps of the servo trace line T) was 0.38 μm and the distance D was set to 0.08 μm.

Note that even when the recording track width Wd (the interval Ps of the servo trace line T) is changed, the full width at half maximum of the isolated waveform is not changed (full width at half maximum in Seventh to Tenth Examples is 150 nm, which is the same as that in Second Example) unless the degree of perpendicular orientation, the azimuth angle α, or the like is not changed.

In Eleventh Example to Fourteenth Example, the component of the magnetic powder contained in the magnetic layer 13 is different from that in Second Example, but the other points are similar to those in Second Example.

In Eleventh Example, as the magnetic powder, hexagonal-shaped strontium ferrite was used. The aspect ratio of this magnetic powder was 3. In Twelfth Example, as the magnetic powder, spherical ε-iron oxide particles were used. The aspect ratio of this magnetic powder was 1.1.

In Thirteenth Example, as the magnetic powder, spherical gallium ferrite was used. The aspect ratio of this magnetic powder was 1. In Fourteenth Example, as the magnetic powder, cubic cobalt-containing ferrite was used. The aspect ratio of this magnetic powder was 1.7.

In Eleventh Example to Fourteenth Example (and Second Example), since the component of the magnetic powder contained in the magnetic layer 13 differs but the degree of perpendicular orientation (66%), the azimuth angle(12°), and the like are the same, the full width at half maximum of the isolated waveform has the same value (150 nm).

In First Comparative Example and Second Comparative Example, since the degree of perpendicular orientation is low (55%, 61%) and the degree of longitudinal orientation is high (46%, 40%), the full width at half maximum of the isolated waveform is wide, i.e., 210 nm, 190 nm. In First Comparative Example and Second Comparative Example, since the peak of the reproduced waveform of the data signal is dull, it is considered that when the difference between the first period and the second period is small (the distance D is small), this difference (or the distance D) cannot be accurately determined.

Meanwhile, in First Example to Eighteenth Example, since the degree of perpendicular orientation is high (65% or more) and the degree of longitudinal orientation is low (35% or less), the full width at half maximum of the isolated waveform is narrow (185 nm or less). Therefore, in First Example to Eighteenth Example, since the peak of the reproduced waveform of the data signal is sharp, even if the difference between the first period and the second period is small (the distance D is small), this difference (or the distance D) can be accurately determined.

Other various Examples and other various Comparative Examples are shown in table 2.

TABLE 2

| | Degree of perpendicular orientation % | Degree of longitudinal orientation % | Distance D Recording track width Wd % | Distance D μm | Recording track width Wd μm | Magnetic powder shape Contained element other than Fe | Full width at half maximum of isolated waveform nm |
|---|---|---|---|---|---|---|---|
| Example15 | 75 | 23 | 21.3 | 0.12 | 0.56 | Hexagonal plate Ba | 128 |
| Example16 | 80 | 21 | 21.3 | 0.12 | 0.56 | Hexagonal plate Ba | 120 |
| Example17 | 85 | 18 | 21.3 | 0.12 | 0.56 | Hexagonal plate Ba | 109 |
| Example18 | 65 | 35 | 21.3 | 0.12 | 0.56 | Hexagonal plate Ba | 120 |
| Example19 | 65 | 35 | 21.3 | 0.12 | 0.56 | Hexagonal plate Ba | 115 |
| Example20 | 75 | 23 | 21.3 | 0.12 | 0.56 | Hexagonal plate Ba | 110 |
| Example21 | 80 | 21 | 21.3 | 0.12 | 0.56 | Hexagonal plate Ba | 90 |
| Comparative Example3 | 65 | 35 | 21.3 | 0.12 | 0.56 | Hexagonal plate Ba | 200 |
| Comparative Example4 | 65 | 35 | 21.3 | 0.12 | 0.56 | Hexagonal plate Ba | 210 |

TABLE 2-continued

|  | Spherical | Aspect ratio | Particle volume nm3 | Magnetic layer thickness nm | Remarks |
|---|---|---|---|---|---|
| Example15 | Plate | 2.8 | 1950 | 80 | Further increased degree of perpendicular orientation |
| Example16 | Plate | 2.8 | 1950 | 80 | Further increased degree of perpendicular orientation |
| Example17 | Plate | 2.8 | 1950 | 80 | Further increased degree of perpendicular orientation |
| Example18 | Plate | 2.5 | 1600 | 80 | Reduced particle volume |
| Example19 | Plate | 2.3 | 1300 | 80 | Further reduced particle volume |
| Example20 | Plate | 2.8 | 1950 | 60 | Increased degree of perpendicular orientation and thinned magnetic layer |
| Example21 | Plate | 2.8 | 1950 | 40 | Increased degree of perpendicular orientation and further thinned magnetic layer |
| Comparative Example3 | Plate | 2.8 | 2500 | 80 | Increased particle volume |
| Comparative Example4 | Plate | 2.8 | 2800 | 80 | Further increased particle volume |

In Fifteenth Example, the degree of perpendicular orientation of the magnetic layer 13 was made higher than that in Fourth Example, i.e., 75%. The degree of degree of longitudinal orientation of the magnetic layer 13 was further reduced to 23%. Note that the other points are the same as those in the Fourth Example (First Example). In Fifteenth Example, since the degree of perpendicular orientation of the magnetic layer 13 is made higher than that in Fourth Example (the degree of longitudinal orientation was further reduced), the full width at half maximum of the isolated waveform was 128 nm, which was narrower than that in Fourth Example.

In Sixteenth Example, the degree of perpendicular orientation of the magnetic layer 13 was made higher than that in Fifteenth Example, i.e., 80%. Further, the degree of degree of longitudinal orientation of the magnetic layer 13 was further reduced to 21%. Note that the other points are the same as those in the Nineteenth Example (First Example). In Twentieth Example, since the degree of perpendicular orientation of the magnetic layer 13 was made higher than that in Fifteenth Example (the degree of longitudinal orientation was further reduced), the full width at half maximum of the isolated waveform was 120 nm, which was narrower than that in Fifteenth Example.

In Seventeenth Example, the degree of perpendicular orientation of the magnetic layer 13 was made higher than that in Sixteenth Example, i.e., 85%. Further, the degree of longitudinal orientation of the magnetic layer 13 was further reduced to 18%. Note that the other points are the same as those in Sixteenth Example (the same as those in First Example). In Seventeenth Example, since the degree of perpendicular orientation of the magnetic layer 13 was made higher than that in Sixteenth Example (the degree of longitudinal orientation was further reduced), the full width at half maximum of the isolated waveform was 109 nm, which was narrower than that in Sixteenth Example.

In Eighteenth Example, the particle volume (the average volume Vave) of the magnetic powder was reduced to 1600 nm$^3$, which was smaller than that in First Example. Note that the other points are the same as those in the First Example. In Eighteenth Example, since the particle volume was made smaller than that in First Example, the full width at half maximum of the isolated waveform was reduced to 120 nm, which was smaller than that in First Example. Note that the full width at half maximum of the isolated waveform is narrowed when the particle volume of the magnetic powder is reduced is because the magnetization transition region is narrowed.

In Nineteenth Example, the particle volume (the average volume Vave) of the magnetic powder is made smaller than that in Eighteenth Example, i.e., 1300 nm$^3$. Note that the other points are the same as those in Eighteenth Example (the same as those in First Example). In Nineteenth Example, since the particle volume was made smaller than that in Eighteenth Example, the full width at half maximum of the isolated waveform was 115 nm, which was narrower than that in Eighteenth Example.

In Twentieth Example, similarly to Fifteenth Example, the degree of perpendicular orientation of the magnetic layer 13 was set to 75% and the degree of longitudinal orientation of the magnetic layer 13 was set to 23%. Meanwhile, in Twentieth Example, the thickness of the magnetic layer 13 was made smaller than that in Fifteenth Example (than that in First Example), i.e., 60 nm. Note that other point are the same as those in Fifteenth Example (the same as those in First Example). In Twentieth Example, since the thickness of the magnetic layer 13 was made smaller than that in Fifteenth Example, the full width at half maximum of the isolated waveform was 110 nm, which was narrower than that in Fifteenth Example.

In Twenty-First Example, the degree of perpendicular orientation of the magnetic layer 13 was made higher than that in Twentieth Example, i.e., 80%. Further, the degree of degree of longitudinal orientation of the magnetic layer 13 was further reduced to 21%. Further, in Twenty-First Example, the thickness of the magnetic layer 13 was further reduced to 40 nm, which was smaller than that in Twentieth Example. The other points are the same as those in the Twentieth Example (First Example).

Here, the conditions in Twenty-First Example are the same as those in Sixteenth Example except that the thickness of the magnetic layer 13 is thinned from 80 nm to 40 nm. In Twenty-First Example, the thickness of the magnetic layer 13 is thinned as compared with Sixteenth Example, so that the full width at half maximum of the isolated waveform is narrowed to 90 nm.

Note that it is considered that in the case where the thickness of the magnetic layer 13 is 90 nm or more, the value of the full width at half maximum of the isolated waveform in the reproduced waveform of the data signal can be reduced (to 185 nm or less) to sharpen the peak of the reproduced waveform.

In Third Comparative Example, the particle volume of the magnetic powder was made larger than that in First Example, i.e., 2,500 nm$^3$. Note that the other points are the same as those in the First Example. In Third Comparative Example, since the particle volume of the magnetic powder was made larger than that in First Example, the full width at half maximum of the isolated waveform was wider than that in First Example, i.e., 200 nm. This value of the full width at half maximum (200 nm) is wide and is not within the appropriate range (185 nm or less).

In Fourth Comparative Example, the particle volume of the magnetic powder was made larger than that in Third Example, i.e., 2,800 nm$^3$. Note that the other points are the same as those in the Third Comparative Example (the same as those in First Example). In Fourth Comparative Example, since the particle volume of the magnetic powder was made larger than that in Third Comparative Example, the full width at half maximum of the isolated waveform was wider than that in Third Comparative Example, i.e., 210 nm. This value of the full width at half maximum (210 nm) is wide and is not within the appropriate range (185 nm or less).

Note that it is considered that in the case where the particle volume of the magnetic powder is 2,300 nm$^3$ or less, the value of the full width at half maximum of the isolated waveform in the reproduced waveform of the data signal can be reduced (to 185 nm or less) to sharpen the peak of the reproduced waveform.

<Effects, Etc.>

As described above, in the present technology, the degree of perpendicular orientation of the magnetic layer 13 is ser to 65% or more and the full width at half maximum of the isolated waveform in the reproduced waveform of the data signal is set to 185 nm or less (see First Example to Twenty-First Example). As a result, the peak of the reproduced waveform of the data signal can be sharpened, and even if the difference between the first period and the second period is small (even when the distance D is small), this difference (or the distance D) can be accurately determined.

Even if the difference between the first period and the second period is small (the distance D is small), this difference (or the distance D) can be accurately determined as described above, and thus, the interval Ps between the servo trace lines T can be reduced and the recording track width Wd can be reduced. Therefore, the number of recording tracks included in one data band d can be increased. As a result, the recording density of data can be further improved.

Here, as the full width at half maximum of the isolated waveform is narrowed, the peak of the reproduced waveform of the data signal becomes sharper and the accuracy of reading the data signal is improved. Therefore, the full width at half maximum of the isolated waveform may be 170 nm or less (see First Example to Twenty-First Example), 150 nm or less (see Second to Fourth and Seventh to Twenty-First embodiments), 130 nm or less (see Fourth and Fifteenth to Twenty-First Examples), 110 nm or less (see Seventeenth, Twentieth, and Twenty-First Examples), or the like.

Further, the higher the degree of perpendicular orientation of the magnetic layer 13, the narrower the full width at half maximum of the isolated waveform. Therefore, the degree of perpendicular orientation may be 70% or more (see Third, Fourth, Fifteenth to Seventeenth, Twenty, and Twenty-First Examples), 75% or more (see Fifteenth to Seventeenth, Twenty, and Twenty-First Examples), 80% or more (see Sixteen, Seventeenth, and Twenty-First Examples), or the like.

Further, in the present technology, the distance D (distance between the points P1 and P2 in the longitudinal direction) is 0.08 μm or more (First Example to Twenty-First Example: see, particularly, Tenth Example). As a result, it is possible to prevent the system from failing.

Note that the present technology is advantageously applied to the case where the distance D is small and 0.62 μm or less (First Example to Twenty-First Example: see, particularly, Seventh Example).

Further, by setting the degree of longitudinal orientation of the magnetic layer 13 to 35% or less (First Example to Twenty-First Example: see, particularly, First Example), even if the difference between the first period and the second period is small (even when the distance D is small), this difference (or the distance D) can be further accurately determined.

Further, by setting the coercive force in the longitudinal direction of the magnetic recording medium 1 to 2,000 Oe or less, even if the difference between the first period and the second period is small (the distance D is small), this difference (or the distance D) can be determined more accurately.

Further, by setting the ratio of the area of the servo bands s to the area of the entire surface of the magnetic layer 13 to 4.0% or less, the area of the data bands d can be widened and the recording capacity of data can be improved. Further, by setting the width of the servo band s to 95 μm or less, the width of the data band d is widened, and the recording capacity of data can be improved.

Further, by setting the recording track width Wd to 2.0 μm or less, the number of recording tracks included in one data band d can be increased. As a result, the recording density of data can be further improved.

Further, by setting the one bit length in the longitudinal direction in the data signal to be recorded on the data band d to 48 nm or less, the recording density of data can be further improved.

Further, by setting the thickness of the magnetic layer 13 to 90 nm or less, it is possible to improve the electromagnetic conversion characteristics. Further, by setting the thickness of the magnetic layer 13 to 90 nm or less, the full width at half maximum of the isolated waveform in the reproduced waveform of the data signal can be narrowed (to 185 nm or less) to sharpen the peak of the reproduced waveform of the data signal (see First Example to Twenty-First Example). As a result, the accuracy of reading the data signal is improved, and thus, it is possible to increase the number of recording tracks to improve the recording density of data.

Further, by setting the particle volume (the average volume Vave) of the magnetic powder to 2,300 nm$^3$ or less, the full width at half maximum of the isolated waveform in the reproduced waveform of the data signal can be narrowed (to 185 nm or less) to sharpen the peak of the reproduced waveform of the data signal (see First Example to Twenty-First Example). As a result, the accuracy of reading the data signal is improved, and thus, it is possible to increase the number of recording tracks to improve the recording density of data.

<Elasticity of Magnetic Recording Medium and Tension Control>

Next, the elasticity of the magnetic recording medium 1, and tension control of the magnetic recording medium 1 by the data recording device 20 will be described. In the LTO standard, the number of recording tracks is rapidly increasing due to the demand for high-density recording of data. In such a case, the recording track width becomes narrower and slight variations in the width (in the Y-axis direction) of the magnetic recording medium 1 is problematic in some cases.

For example, assumption is made that predetermined data is stored in the magnetic recording medium 1 by the data recording device 20 and then (e.g., after being preserved for a certain period) the data recording device 20 reproduces the data stored in the magnetic recording medium 1. In such a case, if the width of the magnetic recording medium 1 at the time of data reproduction fluctuates even slightly compared to the width the magnetic recording medium 1 at the time of data recording, an off-track (the data read head 35 is positioned on the wrong recording track 5) occurs in some cases. For this reason, there is a possibility that the data recorded on the magnetic recording medium 1 cannot be accurately reproduced and an error occurs.

Examples of causes of variations in the width of the magnetic recording medium 1 include variations in temperature and variations in humidity. In general, a method in which the magnetic recording medium 1 is designed so as not to expand or contract, thereby coping with variations in the width of the magnetic recording medium 1 is used. However, it is not practically possible to prevent the magnetic recording medium 1 from expanding or contracting at all.

In this regard, in this embodiment, a method in which the magnetic recording medium 1 is not made hard to be expanded or contracted, but on the contrary, the magnetic recording medium 1 is made likely to be expanded or contracted to some extent and the tension (X-axis direction: the conveying direction of the magnetic recording medium 1) of the magnetic recording medium 1 is controlled (increases or decreases) on the side of the data recording device 20 is used.

Specifically, at the time of reproduction of the data signal, the data recording device 20 reduces the width (in the Y-axis direction) of the magnetic recording medium 1 by increasing the tension of the magnetic recording medium 1 in the longitudinal direction (X-axis direction) as necessary (in the case where the width of the magnetic recording medium 1 is widened). Further, at the time of reproduction of the data signal, the data recording device 20 increases the width of the magnetic recording medium 1 by reducing the tension of the magnetic recording medium 1 in the longitudinal direction as necessary (in the case where the width of the magnetic recording medium 1 is narrowed). Note that the data recording device 20 may control the tension of the magnetic recording medium 1 in the longitudinal direction not only at the time of reproduction of the data signal but also at the time of recording of the data signal.

In accordance with such a method, for example, when the width of the magnetic recording medium 1 fluctuates due to the temperature or the like, the width of the magnetic recording medium 1 can be made constant by adjusting the width of the magnetic recording medium 1 as necessary. Therefore, it is considered that the off-track can be prevented and the data recorded on the magnetic recording medium 1 can be accurately reproduced.

Various Examples and various Comparative Examples are shown in Table 3 and Table 4. The various Examples and various Comparative Examples shown in Table 3 and Table 4 correspond to the various Examples and various Comparative Examples shown in Table 1 and Table 2. The same Examples and the same Comparative Examples are denoted by the same reference symbols. For example, First Example shown in Table 3 is the same as First Example shown in Table 1, and the degree of perpendicular orientation, the full width at half maximum of the isolated waveform, and the like in First Example are as shown in Table 1.

TABLE 3

| | 1% elongation load N in longitudinal direction | Shrinkage ratio % in longitudinal direction | Total thickness TL of magnetic recording medium μm | Thickness TB of base material μm | Longitudinal Y ratio of magnetic recording medium GPa | Longitudinal Y ratio of base material GPa | $\frac{TL - TB}{TB}$ |
|---|---|---|---|---|---|---|---|
| Example 1 | 0.58 | 0.09 | 5 | 3.6 | 8.3 | 7.8 | 0.39 |
| Example 2 | 0.58 | 0.09 | 5 | 3.6 | 8.3 | 7.8 | 0.39 |
| Example 3 | 0.58 | 0.09 | 5 | 3.6 | 8.3 | 7.8 | 0.39 |
| Example 4 | 0.58 | 0.09 | 5 | 3.6 | 8.3 | 7.8 | 0.39 |
| Example 5 | 0.58 | 0.09 | 5 | 3.6 | 8.3 | 7.8 | 0.39 |
| Example 6 | 0.58 | 0.09 | 5 | 3.6 | 8.3 | 7.8 | 0.39 |
| Example 7 | 0.58 | 0.09 | 5 | 3.6 | 8.3 | 7.8 | 0.39 |
| Example 8 | 0.58 | 0.09 | 5 | 3.6 | 8.3 | 7.8 | 0.39 |
| Example 9 | 0.58 | 0.09 | 5 | 3.6 | 8.3 | 7.8 | 0.39 |
| Example10 | 0.58 | 0.09 | 5 | 3.6 | 8.3 | 7.8 | 0.39 |
| Example11 | 0.58 | 0.09 | 5 | 3.6 | 8.3 | 7.8 | 0.39 |
| Example12 | 0.55 | 0.09 | 5 | 3.6 | 8.3 | 7.8 | 0.39 |
| Example13 | 0.55 | 0.09 | 5 | 3.6 | 8.3 | 7.8 | 0.39 |
| Example14 | 0.55 | 0.09 | 5 | 3.6 | 8.3 | 7.8 | 0.39 |
| Comparative Example1 | 0.58 | 0.09 | 5 | 3.6 | 8.3 | 7.8 | 0.39 |
| Comparative Example2 | 0.58 | 0.09 | 5 | 3.6 | 8.3 | 7.8 | 0.39 |

TABLE 4

|  | 1% elongation load N in longitudinal direction | Shrinkage ratio % in longitudinal direction | Total thickness TL of magnetic recording medium μm | Thickness TB of base material μm | Longitudinal Y ratio of magnetic recording medium GPa | Longitudinal Y ratio of base material GPa | $\frac{TL - TB}{TB}$ |
|---|---|---|---|---|---|---|---|
| Example15 | 0.58 | 0.09 | 5 | 3.6 | 8.3 | 7.8 | 0.39 |
| Example16 | 0.58 | 0.09 | 5 | 3.6 | 8.3 | 7.8 | 0.39 |
| Example17 | 0.58 | 0.09 | 5 | 3.6 | 8.3 | 7.8 | 0.39 |
| Example18 | 0.57 | 0.09 | 5 | 3.6 | 8.3 | 7.8 | 0.39 |
| Example19 | 0.57 | 0.09 | 5 | 3.6 | 8.3 | 7.8 | 0.39 |
| Example20 | 0.58 | 0.09 | 5 | 3.6 | 8.3 | 7.8 | 0.39 |
| Example21 | 0.58 | 0.09 | 5 | 3.6 | 8.3 | 7.8 | 0.39 |
| Comparative Example3 | 0.58 | 0.09 | 5 | 3.6 | 8.3 | 7.8 | 0.39 |
| Comparative Example4 | 0.58 | 0.09 | 5 | 3.6 | 8.3 | 7.8 | 0.39 |

In Table 3 and Table 4, the leftmost shows the load [N] (hereafter, referred to simply as longitudinal 1% elongation load) when the magnetic recording medium 1 is extended by 1% to the longitudinal direction (X-axis direction) in the tensile test.

A method of measuring this longitudinal 1% elongation load will be described. In the measurement, first, a sample of the magnetic recording medium 1 having a width of 12.65 mm and a length of 100 mm was prepared by cutting the magnetic recording medium 1 having a tape width (Y-axis direction) of 12.65 mm into a length (X-axis direction) of 100 mm. Then, this sample was set in a measuring instrument, and the measuring instrument extended the sample to the longitudinal direction (X-axis direction) and measured the load at that time. The AUTO GRAPH AG-100D manufactured by Shimadzu Corporation was used as the measuring instrument. Further, the measurement temperature was set to room temperature and the pulling velocity was set to 10 mm/min.

Figure 11:
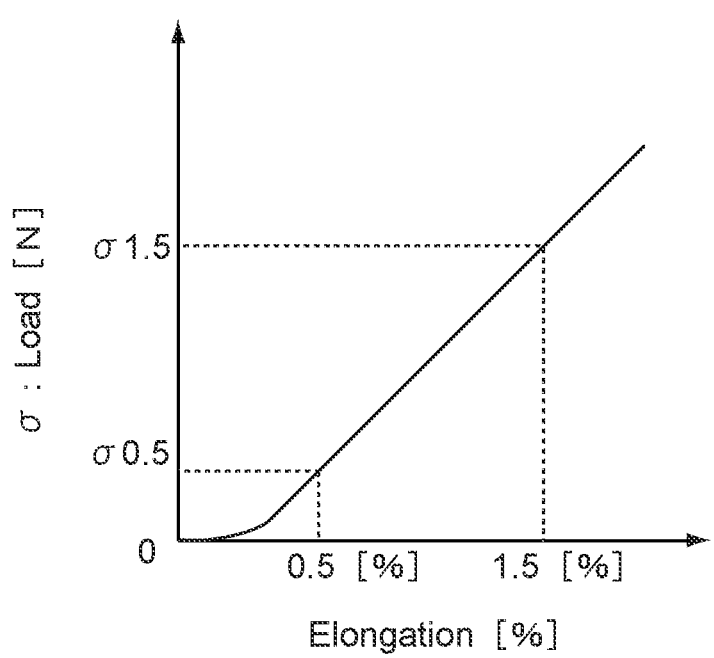
FIG. 11 is a diagram showing the relationship between an elongation of the magnetic recording medium in the longitudinal direction in a tensile test and a load.

FIG. 11 is a diagram showing the relationship between the elongation [%] in the longitudinal direction and the load [N]. As shown in FIG. 11, the relationship between the elongation and the load is non-linear in the case where the sample is hardly extended (when the elongation is close to 0) and nearly linear in the case where the sample is extended to some extent. Therefore, as the value of the longitudinal 1% elongation load, not the value of a part that is non-linear, but the value of a part that is close to linear is used.

Specifically, in the tensile test of the magnetic recording medium 1 in the longitudinal direction, the longitudinal 1% elongation load is represented by the following formula, σ0.5 [N] being the load at the elongation of 0.5% in the magnetic recording medium 1, σ1.5 [N] being the load at the elongation of 1.5% in the magnetic recording medium 1.

Longitudinal 1% elongation load [N] = $\sigma 1.5 - \sigma 0.5$

This longitudinal 1% elongation load is a value indicating the difficulty of expansion and contraction of the magnetic recording medium 1 in the longitudinal direction (X-axis direction) due to an external force. The larger this value, the harder the magnetic recording medium 1 expands and contracts to the longitudinal direction due to an external force. The smaller this value, the easier the magnetic recording medium 1 expands and contracts to the longitudinal direction due to an external force.

Note that the longitudinal 1% elongation load is a value relating to the longitudinal direction of the magnetic recording medium 1, but correlates with the difficulty of expansion and contraction in the width direction (Y-axis direction) of the magnetic recording medium 1. In other words, the larger the value of the longitudinal 1% elongation load, the harder the magnetic recording medium 1 expands or contracts to the width direction due to an external force. The smaller this value, the easier the magnetic recording medium 1 expands and contracts to the width direction due to an external force.

In this embodiment, since it is easier to adjust the width of the magnetic recording medium 1 by tension control when the magnetic recording medium 1 is easily expanded and contracted in the width direction, it is favorable that the longitudinal 1% elongation load is smaller.

Typically, the longitudinal 1% elongation load is 0.6N or less. Note that the longitudinal 1% elongation load may be 0.58 N or less, 0.55 N or less, 0.5 N or less, 0.45 N or less, or the like.

In Table 3 and Table 4, the shrinkage ratio (hereinafter, referred to simply as the longitudinal shrinkage ratio) of the magnetic recording medium 1 in the longitudinal direction (X-axis direction) is shown in the second column from the left. A method of measuring this longitudinal shrinkage ratio will be described. In the measurement, first, a sample of the magnetic recording medium 1 was prepared by cutting the magnetic recording medium 1 to a length (X-axis direction) of 50 mm. Then, two impressions are made by needles at positions 15 mm apart in the longitudinal direction (X-axis direction) on the surface of the magnetic layer 13 of this sample.

Next, a distances L1 between the two impressions is measured at room temperature using a measuring microscope TMU-220ES and a coordinate measuring machine CA-1B manufactured by Topcon Corporation. After that, the sample is preserved (aged) for 72 hours in a thermostatic bath at 60° C. and 10% RH in a state where tension is not applied to the sample (tension free). After that, the sample is taken out of the thermostatic bath and left in a room temperature environment for one hour, and a distance L2 between the two impressions is measured in the same manner as described above.

Then, the longitudinal shrinkage ratio [%] is obtained by the following formula on the basis of the distance L1 (before aging) and the distance L2 (after aging)

Longitudinal shrinkage ratio = $\{(L1 - L2)/L1\} \times 100$

The longitudinal shrinkage ratio is a value indicating the ease of expansion and contraction of the magnetic recording medium 1 in the in the longitudinal direction (X-axis direction) due to the heat in the tension-free state. The larger this value, the easier the magnetic recording medium 1 expands and contracts to the longitudinal direction by heat. The smaller this value, the harder the magnetic recording medium 1 expands and contracts to the longitudinal direction by heat.

Note that the longitudinal shrinkage ratio is a value relating to the longitudinal direction of the magnetic recording medium 1, but correlates with the ease of expansion and contraction of the width direction (Y-axis direction) of the magnetic recording medium 1. That is, the larger the value of the longitudinal shrinkage ratio, the easier the magnetic recording medium 1 expands and contracts to the width direction by heating. The smaller this value, the harder the magnetic recording medium 1 expands and contracts to the width direction by heating.

As described above, from the viewpoint of tension control, it is advantageous for the magnetic recording medium 1 to be expanded and contracted. Meanwhile, expansion and contraction of the magnetic recording medium 1 due to environmental changes such as thermal changes is not favorable because it induces an off-track. Therefore, it is advantageous for the longitudinal shrinkage ratio to be smaller.

Typically, the longitudinal shrinkage ratio is set to 0.1% or less. Note that the longitudinal shrinkage ratio may be 0.09% or less, 0.08% or less, 0.07% or less, 0.06% or less, 0.05% or less, or the like.

Note that in this embodiment, the magnetic recording medium 1 is configured to expand and contract relatively easily when an external force is applied (tension control). Meanwhile, the magnetic recording medium 1 is configured not to easily expand or contract due to environmental changes such as temperature fluctuations.

In Table 3 and Table 4, the third column from the left shows an average thickness TL (average total thickness) of the magnetic recording medium 1. The method of obtaining the average thickness in this the magnetic recording medium 1 is as described above.

The average thickness of the magnetic recording medium 1 correlates with the ease of expansion and contraction of the magnetic recording medium 1 due to an external force. The smaller the average thickness of the magnetic recording medium 1, the easier the magnetic recording medium 1 expands and contracts due to an external force. The larger the average thickness of the magnetic recording medium 1, the harder the magnetic recording medium 1 expands and contracts due to an external force. Therefore, from the viewpoint of tension control, it is advantageous that the average thickness of the magnetic recording medium 1 is smaller.

As described above, the average thickness of the magnetic recording medium 1 is typically 5.6 µm or less. Further, as described above, the average thickness of the magnetic recording medium 1 may be 5.0 µm or less, 4.6 µm or less, 4.4 µm or less, or the like.

In Table 3 and Table 4, the average thickness TB of the base material 11 is shown in the fourth column from the left. The method of obtaining this average thickness of the base material 11 is as described above. The thickness of the base material 11 accounts for more than half of the total thickness of the magnetic recording medium 1. Therefore, this average thickness of the base material 11 correlates with the ease of expansion and contraction of the magnetic recording medium 1 due to an external force. The smaller the average thickness of the base material 11, the easier the magnetic recording medium 1 expands and contracts due to an external force. The larger the average thickness of the base material 11, the harder the magnetic recording medium 1 expands and contracts due to an external force. Therefore, from the viewpoint of tension control, it is advantageous that the average thickness of the base material 11 is smaller.

As described above, the average thickness of the base material 11 is typically 4.2 µm or less. Further, as described above, the average thickness of the base material 11 may be 3.8 µm or less, 3.4 µm or less, or the like.

In Table 3 and Table 4, (TL−TB)/TB is shown in the rightmost column. The denominator of (TL−TB)/TB represents the average thickness TB of the base material 11, and the numerator represents the average thickness (TL−TB) of the coating film (the magnetic layer 13, the non-magnetic layer 12, and the back layer 14). The average thickness of the coating film is obtained by subtracting the average thickness TB of the base material 11 from the average thickness TL of the magnetic recording medium 1. That is, (TL−TB)/TB means the ratio of the average thickness (TL−TB) of the coating film to average thickness TB of the base material 11. Here, the coating film is unlikely to be expanded and contracted due to an external force as compared with the base material 11. If the average thickness TB of the base material 11 is fixed and the average thickness (TL−TB) of the coating film is increased, the value of (TL−TB)/TB increases. In this case, the magnetic recording medium 1 becomes difficult to expand and contract.

In other words, the value of (TL−TB)/TB correlates with the difficulty of expansion and contraction of the magnetic recording medium 1 due to an external force. The larger this value, the harder the magnetic recording medium 1 expands and contracts due to an external force. The smaller this value, the easier the magnetic recording medium 1 expands and contracts due to an external force. Therefore, from the viewpoint of tension control, it is advantageous that the value of (TL−TB)/TB is smaller.

Typically, the value of (TL−TB)/TB is 0.41 or less. Note that the value of (TL−TB)/TB may be 0.39 or less, 0.37 or less, 0.35 or less, or the like.

In Table 3 and Table 4, the Young's modulus of the magnetic recording medium 1 in the longitudinal direction (X-axis direction) is shown in the third column from the right. The Young's modulus of the magnetic recording medium 1 in the longitudinal direction is a value indicating the difficulty of expansion and contraction of the magnetic recording medium 1 in the longitudinal direction due to an external force. The larger this value, the harder the magnetic recording medium 1 expands and contracts to the longitudinal direction due to an external force. The smaller this value, the easier the magnetic recording medium 1 expands and contracts to the longitudinal direction due to an external force.

Note that the Young's modulus of the magnetic recording medium 1 in the longitudinal direction is a value relating to the longitudinal direction of the magnetic recording medium 1, but also correlates with the difficulty of expansion and contraction of the magnetic recording medium 1 in the width direction (Y-axis direction). That is, the larger this value, the harder the magnetic recording medium 1 expands and contracts to the width direction due to an external force, The smaller this value, the easier the magnetic recording medium 1 expands and contracts to the width direction due to an external force. Therefore, from the viewpoint of tension control, it is advantageous that the Young's modulus of the magnetic recording medium 1 in the longitudinal direction is small.

Typically, the Young's modulus of the magnetic recording medium 1 in the longitudinal direction is set to 8.5 GPa or less. Note that the Young's modulus of the magnetic recording medium 1 in the longitudinal direction may be 8.3 GPa or less, 7.9 GPa or less, 7.5 GPa or less, 7.1 GPa or less, or the like.

The Young's modulus is measured using a tensile tester (AG-100D manufactured by Shimadzu Corporation). For example, in the case where it is desired to measure the Young's modulus in the tape longitudinal direction, the tape is cut into a length of 180 mm to prepare a measurement sample. A jig capable of fixing the width of the tape (½ inch) is attached to the tensile tester described above to fix the top and bottom of the tape width.

The distance is set to 100 mm. After the tape sample is chucked, stress is gradually applied in the direction in which the sample is pulled. The pulling velocity is set to 0.1 mm/min. From the change in the stress and the amount of elongation at this time, the Young's modulus is calculated using the following formula.

$$E = (\Delta N/S)/(\Delta x/L) \times 10^{-3}$$

ΔN Change in stress (N)
S Cross-sectional area of the test piece (mm$^2$)
Δx Amount of elongation (mm)
L Distance between gripping jigs (mm)

The range of stress is from 0.5 N to 1.0 N, and the stress change (ΔN) and the amount of elongation (Δx) at this time are used for calculation.

In Table 3 and Table 4, the second column from the right shows the Young's modulus of the base material 11 in the longitudinal direction (X-axis direction). The thickness of the base material 11 accounts for more than half of the total thickness of the magnetic recording medium 1. Therefore, the Young's modulus of the base material 11 in the longitudinal direction correlates with the difficulty of expansion and contraction of the magnetic recording medium 1 due to an external force. The larger this value, the harder the magnetic recording medium 1 expands and contracts to the width direction due to an external force. The smaller this value, the easier the magnetic recording medium 1 expands and contracts to the width direction due to an external force.

Note that the Young's modulus of the base material 11 in the longitudinal direction is a value relating to the longitudinal direction of the magnetic recording medium 1, but also correlates with the difficulty of expansion and contraction of the magnetic recording medium 1 in the width direction (Y-axis direction). That is, the larger this value, the harder the magnetic recording medium 1 expands and contracts to the width direction due to an external force. The smaller this value, the easier the magnetic recording medium 1 expands and contracts to the width direction due to an external force. Therefore, from the viewpoint of tension control, it is advantageous that the Young's modulus of the base material 11 in the longitudinal direction is smaller.

Typically, the Young's modulus of the base material 11 in the longitudinal direction is 8.0 GPa or less. Note that the Young's modulus of the base material 11 in the longitudinal direction may be 7.8 GPa or less, 7.4 GPa or less, 7.0 GPa or less, 6.4 GPa or less, or the like.

Referring to Table 3, in First Example, the longitudinal 1% elongation load was 0.58 N and the longitudinal shrinkage ratio was 0.09%. Further, the average thickness TL of the magnetic recording medium 1 was set to 5 μm, and the average thickness TB of the base material 11 was set to 3.6 μm. The ratio ((TL−TB)/TB) of the average thickness (TL−TB) of the coating film to the average thickness TB of the base material 11 was 0.39.

Further, in First Example, the Young's modulus of the magnetic recording medium 1 in the longitudinal direction was 8.3 GPa and the Young's modulus of the base material 11 in the longitudinal direction was 7.8 GPa. Note that the degree of perpendicular orientation, the full width at half maximum of the isolated waveform, and the like in First Example are as shown in Table 1.

Referring to Table 3 and Table 4, in Second Example to Twenty-First Example and First Comparative Example to Fourth Comparative Example, the value of the longitudinal 1% elongation load, the longitudinal shrinkage ratio, the average thickness of the magnetic recording medium 1, the average thickness of the base material 11, the Young's modulus of the magnetic recording medium 1, the Young's modulus of the base material 11, and the value of (TL−TB)/TB are basically the same as those in First Example.

However, in Twelfth Example to Fourteenth Example, the longitudinal 1% elongation load was 0.55 N, which was smaller than that in First Example (because the elements contained in the magnetic layer differ: see Table 1). Further, also in Eighteenth Example and Nineteenth Example, the longitudinal 1% elongation load was smaller than that in First Example, i.e., 0.57 N. Note that the fact that the longitudinal 1% elongation load is smaller than those in the other Examples means that the elasticity at the time of tension control is better than that in the other Examples.

Next, still other Examples and Comparative Examples will be described. Table 5 shows still other Examples and Comparative Examples.

TABLE 5

| | Degree of perpendicular orientation % | Degree of longitudinal orientation % | Distance D / Recording track width WD % | Distance D μm | Recording track width Wd μm | Magnetic powder shape / Contained element other than Fe | Full width at half maximum of isolated waveform nm | Spherical | Aspect ratio | Particle volume nm3 | Magnetic layer thickness nm | 1% elongation load N in longitudinal direction | Shrinkage ratio % in longitudinal direction | Total thickness TL of magnetic recording medium μm | Thickness TB of base material μm | Longitudinal Y ratio of magnetic recording medium GPa | Longitudinal Y ratio of base material GPa | $\frac{TL-TB}{TB}$ |
|---|---|---|---|---|---|---|---|---|---|---|---|---|---|---|---|---|---|---|
| Example22 | 65 | 35 | 21.3 | 0.12 | 0.56 | Hexagonal plate Ba | 170 | Plate | 2.8 | 1950 | 80 | 0.58 | 0.07 | 5 | 3.6 | 8.3 | 7.8 | 0.39 |
| Example23 | 65 | 35 | 21.3 | 0.12 | 0.56 | Hexagonal plate Ba | 170 | Plate | 2.8 | 1950 | 80 | 0.58 | 0.04 | 5 | 3.6 | 8.3 | 7.8 | 0.39 |
| Example24 | 65 | 35 | 21.3 | 0.12 | 0.56 | Hexagonal plate Ba | 170 | Plate | 2.8 | 1950 | 80 | 0.50 | 0.09 | 4.3 | 3.2 | 8.3 | 7.8 | 0.34 |
| Example25 | 65 | 35 | 21.3 | 0.12 | 0.56 | Hexagonal plate Ba | 170 | Plate | 2.8 | 1950 | 80 | 0.43 | 0.09 | 4.2 | 3.2 | 7.4 | 6.4 | 0.31 |
| Example26 | 65 | 35 | 21.3 | 0.12 | 0.56 | Hexagonal plate Ba | 185 | Plate | 2.8 | 1950 | 88 | 0.58 | 0.07 | 5 | 3.6 | 8.3 | 7.8 | 0.39 |
| Comparative Example5 | 65 | 35 | 21.3 | 0.12 | 0.56 | Hexagonal plate Ba | 210 | Plate | 2.8 | 2800 | 80 | 0.58 | 0.11 | 5 | 3.6 | 8.3 | 7.8 | 0.39 |
| Comparative Example6 | 65 | 35 | 21.3 | 0.12 | 0.56 | Hexagonal plate Ba | 210 | Plate | 2.8 | 2800 | 80 | 0.61 | 0.09 | 5 | 3.5 | 8.4 | 8.0 | 0.43 |

In Twenty-Second Example, the values other than the longitudinal shrinkage ratio, of various values (the degree of perpendicular orientation, the degree of longitudinal orientation, . . . , (TL−TB)/TB) shown in 17 columns in Table 5, are the same as those in First Example (see Table 1 and Table 3). Specifically, in Twenty-Second Example, the longitudinal shrinkage ratio was smaller than that in First Example (and other Examples), i.e., 0.07%. In Twenty-Second Example, since the longitudinal shrinkage ratio is smaller than that in First Example, it is stronger (harder to expand and contract) than First Example (and other Examples) against environmental changes such as temperature fluctuations.

In Twenty-Third Example, the full width at half maximum of the isolated waveform in the reproduced waveform of the data signal was 170 nm. Further, in Twenty-Third Example, the longitudinal shrinkage ratio was 0.04%, which was even smaller than that in Twenty-Second Example. Note that the other points are the same as those in Twenty-Second Example. In Twenty-Third Example, since the longitudinal shrinkage ratio is smaller than that in Twenty-Second Example, it is further stronger (harder to expand and contract) than Twenty-Second Example (and other Examples) against environmental changes such as temperature fluctuations.

In Twenty-Fourth Example, the full width at half maximum of the isolated waveform in the reproduced waveform of the data signal was 170 nm. Further, in Twenty-Fourth Example, the longitudinal shrinkage ratio was larger than that in Twenty-Second Example (same as that in First Example and the like), i.e., 0.09%, but the longitudinal 1% elongation load was smaller than that in Twenty-Second Example, i.e., 0.50 N.

In Twenty-Fourth Example, since the longitudinal shrinkage ratio is slightly larger than that in Twenty-Second Example (the same as that in First Example and the like), it is slightly weaker than Twenty-Second Example against environmental changes such as temperature fluctuations. However, in Twenty-Fourth Example, since the longitudinal 1% elongation load is smaller than that in Twenty-Second Example, the elasticity at the time of tension control is better than that in Twenty-Second Example (and other Examples).

Further, in Twenty-Fourth Example, the average thickness TL of the magnetic recording medium 1 was set to 4.3 μm, which was smaller than that in Twenty-Second Example, and the average thickness TB of the base material 11 was set to 3.2 μm, which was smaller than that in Twenty-Second Example. Further, in Twenty-Fourth Example, the value of (TL−TB)/TB was set to 0.34, which was smaller than that in Twenty-Second Example. Note that the other points are the same as those in Twenty-Second Example.

In Twenty-Fourth Example, since the average thickness TL of the magnetic recording medium 1, the average thickness TB of the base material 11, and the value of (TL−TB)/TB are smaller than those in Twenty-Second Example, the elasticity at the time of tension control is better than that in Twenty-Second Example (and other Examples).

In Twenty-Fifth Example, the full width at half maximum of the isolated waveform in the reproduced waveform of the data signal was 170 nm. Further, in Twenty-Fifth Example, the longitudinal 1% elongation load was 0.43 N, which was even smaller than that in Twenty-Fourth Example. In Twenty-Fifth Example, since the longitudinal 1% elongation load is smaller than that in Twenty-Fourth Example, the elasticity at the time of tension control is better than that in Twenty-Fourth Example (and other Examples).

Further, in Twenty-Fifth Example, the average thickness TB of the base material 11 is set to be the same as that in Twenty-Fourth Example (3.2 μm) and the average thickness TL of the magnetic recording medium 1 was further reduced to 4.2 μm, which was smaller than that in Twenty-Fourth Example. For this reason, the value of (TL−TB)/TB in Twenty-Fifth Example was smaller than that in Twenty-Fourth Example, i.e., 0.31.

In Twenty-Fifth Example, since the average thickness TL of the magnetic recording medium 1 and the value of (TL−TB)/TB are smaller than those in Twenty-Fourth Example, the elasticity of the magnetic recording medium 1 at the time of tension control is better than that in Twenty-Fourth Example (and other Examples).

Further, in Twenty-Fifth Example, the Young's modulus of the magnetic recording medium 1 in the longitudinal direction was smaller than that in Twenty-Fourth Example, i.e., 7.4 GPa, and the Young's modulus of the base material 11 in the longitudinal direction was also smaller than that in Twenty-Fourth Example, i.e., 6.4 GPa. The other points are the same as those in Twenty-Fourth Example.

In Twenty-Fifth Example, since the Young's modulus of the magnetic recording medium 1 in the longitudinal direction and the Young's modulus of the base material 11 in the longitudinal direction are smaller than those in Twenty-Fourth Example, the elasticity of the magnetic recording medium 1 at the time of tension control is better than that in Twenty-Fourth Example (and other Examples).

In Twenty-Sixth Example, the thickness of the magnetic layer 13 was increased to 88 nm, which was larger than that in Twenty-Second Example (than that in First Example). The other points are the same as those in Twenty-Second Example (the same as those in First Example). In Twenty-Sixth Example, the full width at half maximum of the isolated waveform was wider than that in Twenty-Second Example, i.e., 185 nm because the thickness of the magnetic layer 13 was made larger than that in Twenty-Second Example.

In Fifth Comparative Example, the particle volume (the average volume Vave) of the magnetic powder contained in the magnetic layer 13 was 2,800 nm$^3$. For this reason, the full width at half maximum of the isolated waveform in the reproduced waveform of the data signal was increased to 210 nm. This value (210 nm) of the full width at half maximum is not within the appropriate range (185 nm or less).

Further, in Fifth Comparative Example, the longitudinal shrinkage ratio was 0.11%. The value of the longitudinal shrinkage ratio (0.11%) is not within the appropriate range (0.1% or less). Therefore, It is considered that it is vulnerable to environmental changes such as temperature fluctuations and the possibility of an occurrence of an off-track increases.

In Sixth Comparative Example, the particle volume (the average volume Vave) of the magnetic powder was set to 2800 nm$^3$, similarly to Fifth Comparative Example. For this reason, the full width at half maximum of the isolated waveform in the reproduced waveform of the data signal is 210 nm and the value of the full width at half maximum is not within the appropriate range (185 nm or less).

In Sixth Comparative Example, the longitudinal 1% elongation load was 0.61 N. This value (0.61N) is not within the appropriate range (0.6 N or less). Therefore, it is considered that the elasticity of the magnetic recording medium 1 at the time of tension control is poor.

Further, in Sixth Comparative Example, the value of (TL−TB)/TB was 0.43. This value (0.43) is not within the appropriate range (0.41 or less). Therefore, it is considered that the elasticity of the magnetic recording medium 1 at the time of tension control is poor.

[Effect of Elasticity of Magnetic Recording Medium 1]

As described above, in this embodiment, the longitudinal 1% elongation load is 0.6 N or less. This increases the elasticity of the magnetic recording medium 1, thereby making it easier to adjust the width of the magnetic recording medium 1 by tension control. Therefore, even if the width of the magnetic recording medium 1 fluctuates due to temperatures or the like (e.g., in an accelerated aging environment such as 45° C. for one month), the width of the magnetic recording medium 1 can be made constant by adjusting the width of the magnetic recording medium 1. Therefore, the off-track can be prevented, and the data recorded on the magnetic recording medium 1 can be accurately reproduced.

Further, in this embodiment, it is possible to cope with slight variations in the width of the magnetic recording medium 1. As a result, the number of recording tracks of the magnetic recording medium 1 can be increased, and high-density recording of data can be realized. Note that as described above, in this embodiment, high-density recording of data is realized by the degree of perpendicular orientation of the magnetic layer 13 (65% or more) and the full width at half maximum of the isolated waveform of the data signal (185 nm or less). By a synergistic effect with this effect, it is possible to realize higher density recording of data.

Further, in this embodiment, the longitudinal shrinkage ratio is set to 0.1% or less. This makes it difficult for the width of the magnetic recording medium 1 to fluctuate due to temperature and the like (even in a long-term accelerated aging environment such as 45° C. for one month). Therefore, the off-track can be prevented, and the data recorded on the magnetic recording medium 1 can be accurately reproduced.

Further, in this embodiment, the average thickness TL of the magnetic recording medium 1 is set to 5.6 μm or less. This further increases the elasticity of the magnetic recording medium 1 by an external force, thereby making it easier to adjust the width of the magnetic recording medium 1 by tension control. Therefore, the off-track can be prevented more appropriately, and the data recorded on the magnetic recording medium 1 can be reproduced more accurately.

Further, in this embodiment, the average thickness TB of the base material 11 is set to 4.2 μm or less. This further increases the elasticity of the magnetic recording medium 1 by an external force, thereby making it easier to adjust the width of the magnetic recording medium 1 by tension control. Therefore, the off-track can be prevented more appropriately, and the data recorded on the magnetic recording medium 1 can be reproduced more accurately.

Further, in this embodiment, the value of (TL−TB)/TB is set to 0.41 or less. This further increases the elasticity of the magnetic recording medium 1 by an external force, thereby making it easier to adjust the width of the magnetic recording medium 1 by tension control. Therefore, the off-track can be prevented more appropriately, and the data recorded on the magnetic recording medium 1 can be reproduced more accurately.

Further, in this embodiment, the Young's modulus of the magnetic recording medium 1 in the longitudinal direction is set to 8 5 GPa or less. This further increases the elasticity of the magnetic recording medium 1 by an external force, thereby making it easier to adjust the width of the magnetic recording medium 1 by tension control. Therefore, the off-track can be prevented more appropriately, and the data recorded on the magnetic recording medium 1 can be reproduced more accurately.

Further, in this embodiment, the Young's modulus of the base material 11 in the longitudinal direction is set to 8.0 GPa or less. This further increases the elasticity of the magnetic recording medium 1 by an external force, thereby making it easier to adjust the width of the magnetic recording medium 1 by tension control. Therefore, the off-track can be prevented more appropriately, and the data recorded on the magnetic recording medium 1 can be reproduced more accurately.

<Method of Producing Magnetic Recording Medium>

Next, a method of producing the magnetic recording medium 1 will be described. First, a coating material for forming a non-magnetic layer is prepared by kneading and dispersing a non-magnetic powder, a binder, a lubricant, and the like in a solvent. Next, a coating material for forming a magnetic layer is prepared by kneading and dispersing a magnetic powder, a binder, a lubricant, and the like in a solvent. Next, a coating material for forming a back layer is prepared by kneading and dispersing a binder, a non-magnetic powder, and the like in a solvent. For preparing the coating material for forming a magnetic layer, the coating material for forming a non-magnetic layer, and the coating material for forming a back layer, for example, the following solvents, dispersing devices, and kneading devices can be used.

Examples of the solvent used for preparing coating materials include a ketone solvent such as acetone, methyl ethyl ketone, methyl isobutyl ketone, and cyclohexanone, an alcohol solvent such as methanol, ethanol, and propanol, an ester solvent such as methyl acetate, ethyl acetate, butyl acetate, propyl acetate, ethyl lactate, and ethylene glycol acetate, an ether solvent such as diethylene glycol dimethyl ether, 2-ethoxyethanol, tetrahydrofuran, and dioxane, an aromatic hydrocarbon solvent such as benzene, toluene, and xylene, and a halogenated hydrocarbon solvent such as methylene chloride, ethylene chloride, carbon tetrachloride, chloroform, and chlorobenzene. These may be used alone or may be appropriately mixed and used.

As the above-mentioned kneading apparatus used for the preparation of the coating materials, for example, a kneading apparatus such as a continuous twin-screw kneader, a continuous twin-screw kneader capable of diluting in multiple stages, a kneader, a pressure kneader, and a roll kneader can be used. However, the present technology is not particularly limited to these apparatuses. Further, as the above-mentioned dispersion apparatus used for the preparation of the coating materials, for example, a dispersion apparatus such as a roll mill, a ball mill, a horizontal sand mil, a perpendicular sand mil, a spike mill, a pin mill, a tower mill, a pearl mill (e.g., "DCP mill" manufactured by Eirich Co., Ltd.), a homogenizer, and an ultrasonic disperser can be used. However, the present technology is not particularly limited to these apparatuses.

Next, the non-magnetic layer 12 is formed by applying a coating material for forming a non-magnetic layer onto one main surface of the base material 11 and drying the coating material. Subsequently, a coating material for forming a magnetic layer is applied onto the non-magnetic layer 12 and dried to form the magnetic layer 13 on the non-magnetic layer 12. Note that it is favorable to orient, during drying, the magnetic field of the magnetic powder in the thickness direction of the base material 11 by means of, for example, a solenoid coil. Further, during drying, after orienting the magnetic field of the magnetic powder in the traveling direction (longitudinal direction) of the base material 11 by means of, for example, a solenoid coil, the magnetic field may be oriented in the thickness direction of the base material 11. After forming the magnetic layer 13, the back layer 14 is formed by applying a coating material for forming a back layer onto the other main surface of the base material 11 and drying the coating material. As a result, the magnetic recording medium 1 is obtained.

After that, calendaring treatment is performed on the obtained magnetic recording medium 1 to smooth the surface of the magnetic layer 13. Next, the magnetic recording medium 1 on which calendaring treatment has been performed is wound into rolls, and then, heat treatment is performed on the magnetic recording medium 1 in this condition to transfer a large number of protrusions 14A on the surface of back layer 14 to the surface of the magnetic layer 13. As a result, a large number of holes 13A are formed on the surface of the magnetic layer 13.

The temperature of the heat treatment is favorably 55° C. or higher and 75° C. or less. In the case where the temperature of the heat treatment is 55° C. or higher, favorable transferability can be achieved. Meanwhile, in the case where the temperature of the heat treatment is 75° C. or more, the amount of pores becomes too large, and the lubricant on the surface becomes excessive. Here, the temperature of the heat treatment is the temperature of the atmosphere in which the magnetic recording medium 1 is held.

The time of the heat treatment is favorably 15 hours or more and 40 hours or less. In the case where the time of the heat treatment is 15 hours or more, favorable transferability can be obtained. Meanwhile, in the case where the time of the heat treatment is 40 hours or less, a decrease in productivity can be suppressed.

Finally, the magnetic recording medium 1 is cut into a predetermined width, (e.g., ½ inch width). In this way, the target magnetic recording medium 1 is obtained.

[Process of Preparing Coating Material for Forming a Magnetic Layer]

Next, the process of preparing a coating material for forming a magnetic layer will be described. First, a first composition of the following formulation was kneaded with an extruder. Next, the kneaded first composition and a second composition of the following formulation were added to a stirring tank including a dispersion device to perform preliminary mixing. Subsequently, sand mill mixing was further performed, and filter treatment was performed to prepare a coating material for forming a magnetic layer.

(First Composition)
Powder of barium ferrite ($BaFe_{12}O_{19}$) particles (hexagonal plate shape, aspect ratio 2.8, particle volume 1,950 $nm^3$):100 parts by mass
Vinyl chloride resin (30% by mass of cyclohexanone solution: 10 parts by mass
(the degree of polymerization 300, Mn=10,000, containing $OSO_3K$=0.07 mmol/g, secondary OH=0.3 mmol/g as polar groups.)
(Aluminum oxide powder: 5 parts by mass
($\alpha$-$Al_2O_3$, average particle size 0.2 µm)
Carbon black: 2 parts by mass
(Manufactured by Tokai Carbon Co., Ltd., trade name: Seast TA)
(Second Composition)
Vinyl chloride resin: 1.1 parts by mass
(Resin solution: resin content 30% by mass, cyclohexanone 70% by mass)
N-butyl stearate: 2 parts by mass
Methylethylketone: 121.3 parts by mass
Toluene: 121.3 parts by mass
Cyclohexanone: 60.7 parts by mass Finally, four parts by mass of polyisocyanate (trade name: Coronate L, manufactured by Nippon Polyurethane Co., Ltd.) and two parts by mass of myristic acid were added, as curing agents, to the coating material for forming a magnetic layer prepared as described above.

[Process of Preparing Coating Material for Forming Non-Magnetic Layer]

Next, the process of preparing a coating material for forming a non-magnetic layer will be described. First, a third composition of the following formulation was kneaded with an extruder. Next, the kneaded third composition and a fourth composition of the following formulation were added to a stirring tank including a dispersion device to perform preliminary mixing. Subsequently, sand mill mixing was further performed, and filter treatment was performed to prepare a coating material for forming a non-magnetic layer.

(Third Composition)
Acicular iron oxide powder: 100 parts by mass
($\alpha$-$Fe_2O_3$, average major axis length 0.15 µm)
Vinyl chloride resin: 55.6 parts by mass
(Resin solution: resin content 30% by mass, cyclohexanone 70% by mass)
Carbon black: 10 parts by mass
(Average particle size 20 nm)
(Fourth Composition)
Polyurethane resin UR8200 (manufactured by TOYOBO CO., LTD.): 18.5 parts by mass
N-butyl stearate: 2 parts by mass
Methylethylketone: 108.2 parts by mass
Toluene: 108.2 parts by mass
Cyclohexanone: 18.5 parts by mass Finally, four parts by mass of polyisocyanate (trade name: Coronate L, manufactured by Nippon Polyurethane Co., Ltd.) and two parts by mass of myristic acid were added, as curing agents, to the coating material for forming a non-magnetic layer prepared as described above.

[Process of Preparing Coating Material for Forming Back Layer]

Next, the process of preparing the coating material for forming a back layer will be described. A coating material for forming a back layer was prepared by mixing the following raw materials in a stirring tank including a dispersion device and performing filter treatment thereon.

Powder of carbon black particles (average particle size 20 nm): 90 parts by mass
Powder of carbon black particles (average particle size 270 nm): 10 parts by mass
Polyester polyurethane: 100 parts by mass
(manufactured by Nippon Polyurethane Co., Ltd., product name: N-2304)
Methyl ethyl ketone: 500 parts by mass
Toluene: 400 parts by mass
Cyclohexanone: 100 parts by mass Note that the type and the blending amount of the inorganic particles may be changed as follows.
Powder of carbon black particles (average particle size 20 nm): 80 parts by mass
Powder of carbon black particles (average particle size 270 nm): 20 parts by mass
Further, the type and the blending amount of the inorganic particles may be changed as follows.
Powder of carbon black particles (average particle size 270 nm): 100 parts by mass

[Application Process]

The coating material for forming a magnetic layer and coating material for forming a non-magnetic layer prepared as described above were used to form a non-magnetic layer having an average thickness of 1.0 to 1.1 µm and a magnetic layer having an average thickness of 40 to 100 nm on one main surface of an elongated polyethylene naphthalate film (hereinafter, referred to as "PEN film") that is a nonmagnetic support (e.g., average thickness of 4.0 µm) as follows. First, the coating material for forming a non-magnetic layer was applied onto one main surface of the PEN film and dried to form a non-magnetic layer. Next, the coating material for forming a magnetic layer was applied onto the non-magnetic layer and dried to form a magnetic layer. Note that when the coating material for forming a magnetic layer was dried, the magnetic field of the magnetic powder was oriented in the thickness direction of the film by means of a solenoidal coil. Note that the degree of orientation in the thickness direction (perpendicular direction) and the degree of orientation in the longitudinal direction of the magnetic recording medium were set to predetermined values by adjusting the magnitude of the magnetic field from the solenoid coil (2 to 3 times the holding force of the magnetic powder), adjusting the solid content of the coating material for forming a magnetic layer, or adjusting the conditions for the magnetic powder to orient in a magnetic field by the adjustment of the drying conditions (drying temperature and drying time) of the coating material for forming a magnetic layer. Subsequently, a non-magnetic layer was formed by applying the coating material for forming a back layer onto the other main surface of the PEN film and drying the coating material. In this way, a magnetic recording medium was obtained. Note that in order to increase the degree of orientation, the dispersed condition of the coating material for forming a magnetic layer needs to be improved. In addition, in order to increase the degree of perpendicular orientation, it is also useful to magnetize the magnetic powder in advance before the magnetic recording medium enters the orientation device.

[Calendar Process, Transfer Process]

Subsequently, calendar treatment was performed to smooth the surface of the magnetic layer. Next, after winding the obtained magnetic recording medium in a roll, heat treatment of 60° C. for 10 hours was performed twice on the magnetic recording medium in this condition.

As a result, a large number of protrusions on the surface of the back layer were transferred to the surface of the magnetic layer, and a large number of holes were formed on the surface of the magnetic layer.

[Cutting Process]

The magnetic recording medium obtained as described above was cut into a ½ inch (12.65 mm) width. As a result, a target elongated magnetic recording medium was obtained.

<Various Modified Examples>

It should be noted that the present technology may take the following configurations.

(1) A tape-shaped magnetic recording medium, including:
  a base material; and
  a magnetic layer, the magnetic recording medium being long in a longitudinal direction and short in a width direction, in which
  the magnetic layer includes a data band long in the longitudinal direction and a servo band long in the longitudinal direction, a data signal being written to the data band, a servo signal being written to the servo band, the degree of perpendicular orientation of the magnetic layer being 65% or more,
  a full width at half maximum of an isolated waveform in a reproduced waveform of the data signal is 185 nm or less,
  a thickness of the magnetic layer is 90 nm or less, and
  a thickness of the base material is 4.2 µm or less.

(2) The magnetic recording medium according to (1) above, in which the full width at half maximum of the isolated waveform is 170 nm or less.

(3) The magnetic recording medium according to (2) above, in which the full width at half maximum of the isolated waveform is 150 nm or less.

(4) The magnetic recording medium according to (3) above, in which the full width at half maximum of the isolated waveform is 130 nm or less.

(5) The magnetic recording medium according to (4) above, in which the full width at half maximum of the isolated waveform is 110 nm or less.

(6) The magnetic recording medium according to any one of (1) to (5) above, in which the degree of perpendicular orientation is 70% or more.

(7) The magnetic recording medium according to (6) above, in which the degree of perpendicular orientation is 75% or more.

(8) The magnetic recording medium according to (7) above, in which the degree of perpendicular orientation is 80% or more.

(9) The magnetic recording medium according to any one of (1) to (8) above, in which
  the data band includes a plurality of recording tracks that is long in the longitudinal direction, aligned in the width direction, and has a predetermined recording track width for each track in the width direction,
  a servo signal recording pattern includes a plurality of stripes inclined at a predetermined azimuth angle with respect to the width direction, and
  a distance between a point P1 and a point P2 in the longitudinal direction is 0.08 µm or more, the point P1 representing an arbitrary point on an arbitrary stripe of the plurality of stripes, the point P2 representing a point on the arbitrary stripe located away from the point P1 in the width direction by an amount corresponding to the recording track width.

(10) The magnetic recording medium according to (9) above, in which the distance between the point P1 and the point P2 in the longitudinal direction is 0.62 µm or less.

(11) The magnetic recording medium according to any one of (1) to (10) above, in which the degree of longitudinal orientation of the magnetic layer is 35% or less.

(12) The magnetic recording medium according to any one of (1) to (11) above, in which
  a coercive force of the magnetic recording medium in the longitudinal direction is 2,000 Oe or less.

(13) The magnetic recording medium according to any one of (1) to (12) above, in which
  a ratio of an area of the servo band to an area of an entire surface of the magnetic layer is 4.0% or less.

(14) The magnetic recording medium according to any one of (1) to (13) above, in which
  the magnetic layer contains a magnetic powder, and
  the magnetic powder has a particle volume of 2,300 $nm^3$ or less.

(15) The magnetic recording medium according to any one of (1) to (14) above, in which
  the number of data bands is 4n (n represents an integer greater than or equal to two), and the number of servo bands is 4n+1.

(16) The magnetic recording medium according to any one of (1) to (15) above, in which a width of the servo band is 95 µm or less.

(17) The magnetic recording medium according to any one of (1) to (16) above, in which the data band includes a plurality of recording tracks that is long in the longitudinal direction, aligned in the width direction, and has a predetermined recording track width for each track in the width direction, and the recording track width is 2.0 µm or less.

(18) The magnetic recording medium according to any one of (1) to (17) above, in which one bit length in the longitudinal direction in a data signal to be recorded on the data band is 48 nm or less.

(19) The magnetic recording medium according to any one of (1) to (18) above, in which the magnetic layer includes a magnetic powder of hexagonal ferrite, ε-iron oxide, or cobalt-containing ferrite.

(20) The magnetic recording medium according to any one of (1) to (19) above, in which a value of σ1.5-σ0.5 is 0.6 N or less in a tensile test of the magnetic recording medium in the longitudinal direction, σ0.5 being a load at an elongation of 0.5% in the magnetic recording medium, σ1.5 being a load at an elongation of 1.5% in the magnetic recording medium.

(21) The magnetic recording medium according to any one of (1) to (20) above, in which a shrinkage ratio in the longitudinal direction when the magnetic recording medium is preserved at 60° C. for 72 hours is 0.1% or less.

(22) The magnetic recording medium according to any one of (1) to (21) above, in which a thickness of the magnetic recording medium is 5.6 µm or less.

(23) The magnetic recording medium according to any one of (1) to (22) above, in which a value of (TL−TB)/TB is 0.41 or less, TB being a thickness of the base material, TL being a thickness of the magnetic recording medium.

(24) The magnetic recording medium according to any one of (1) to (23) above, in which a Young's modulus of the magnetic recording medium in the longitudinal direction is 8.5 GPa or less.

(25) The magnetic recording medium according to any one of (1) to (24) above, in which a Young's modulus of the base material in the longitudinal direction is 8.0 GPa or less.

(26) The magnetic recording medium according to any one of (1) to (25) above, in which a width of the magnetic recording medium is adjusted by increasing or decreasing tension in the longitudinal direction.

(27) A cartridge, including:

a tape-shaped magnetic recording medium including a base material, and a magnetic layer, the magnetic recording medium being long in a longitudinal direction and short in a width direction, in which the magnetic layer includes a data band long in the longitudinal direction and a servo band long in the longitudinal direction, a data signal being written to the data band, a servo signal being written to the servo band, the degree of perpendicular orientation of the magnetic layer being 65% or more, a full width at half maximum of an isolated waveform in a reproduced waveform of the data signal is 185 nm or less, a thickness of the magnetic layer is 90 nm or less, and a thickness of the base material is 4.2 µm or less.

REFERENCE SIGNS LIST d data band
s servo band
5 recording track
6 servo signal recording pattern
7 stripe
1 magnetic recording medium
11 base material
12 non-magnetic layer
13 magnetic layer
14 back layer
20 data recording device

The invention claimed is:

1. A magnetic recording medium, comprising:

a base material; and a magnetic layer, the magnetic recording medium being long in a longitudinal direction and short in a width direction, wherein the magnetic layer includes a data band long in the longitudinal direction and a servo band long in the longitudinal direction, a data signal being written to the data band, a servo signal being written to the servo band, a degree of perpendicular orientation of the magnetic layer being 65% or more, a full width at half maximum of an isolated waveform in a reproduced waveform of the data signal is 185 nm or less, a thickness of the magnetic layer is 90 nm or less, a thickness of the base material is 4.2 µm or less, and wherein the magnetic recording medium is tape-shaped.

2. The magnetic recording medium according to claim 1, wherein the full width at half maximum of the isolated waveform is 170 nm or less.

3. The magnetic recording medium according to claim 2, wherein the full width at half maximum of the isolated waveform is 150 nm or less.

4. The magnetic recording medium according to claim 3, wherein the full width at half maximum of the isolated waveform is 130 nm or less.

5. The magnetic recording medium according to claim 4, wherein the full width at half maximum of the isolated waveform is 110 nm or less.

6. The magnetic recording medium according to claim 1, wherein the degree of perpendicular orientation is 70% or more.

7. The magnetic recording medium according to claim 6, wherein the degree of perpendicular orientation is 75% or more.

8. The magnetic recording medium according to claim 7, wherein the degree of perpendicular orientation is 80% or more.

9. The magnetic recording medium according to claim 7, wherein the data band includes a plurality of recording tracks that is long in the longitudinal direction, aligned in the width direction, and has a predetermined recording track width for each track in the width direction, a servo signal recording pattern includes a plurality of stripes inclined at a predetermined azimuth angle with respect to the width direction, and a distance between a point P1 and a point P2 in the longitudinal direction is 0.08 µm or more, the point P1 representing an arbitrary point on an arbitrary stripe of the plurality of stripes, the point P2 representing a point on the arbitrary stripe located away from the point P1 in the width direction by an amount corresponding to the recording track width.

10. The magnetic recording medium according to claim 9, wherein
the distance between the point P1 and the point P2 in the longitudinal direction is 0.62 μm or less.

11. The magnetic recording medium according to claim 1, wherein
a degree of longitudinal orientation of the magnetic layer is 35% or less.

12. The magnetic recording medium according to claim 1, wherein
a coercive force of the magnetic recording medium in the longitudinal direction is 2,000 Oe or less.

13. The magnetic recording medium according to claim 1, wherein
a ratio of an area of the servo band to an area of an entire surface of the magnetic layer is 4.0% or less.

14. The magnetic recording medium according to claim 1, wherein
the magnetic layer contains a magnetic powder, and
the magnetic powder has a particle volume of 2,300 nm$^3$ or less.

15. The magnetic recording medium according to claim 1, wherein
the number of data bands is 4n (n represents an integer greater than or equal to two), and the number of servo bands is 4n+1.

16. The magnetic recording medium according to claim 1, wherein
a width of the servo band is 95 μm or less.

17. The magnetic recording medium according to claim 1, wherein
the data band includes a plurality of recording tracks that is long in the longitudinal direction, aligned in the width direction, and has a predetermined recording track width for each track in the width direction, and
the recording track width is 2.0 μm or less.

18. The magnetic recording medium according to claim 1, wherein
one bit length in the longitudinal direction in a data signal to be recorded on the data band is 48 nm or less.

19. The magnetic recording medium according to claim 1, wherein
the magnetic layer includes a magnetic powder of hexagonal ferrite, ε-iron oxide, or cobalt-containing ferrite.

20. The magnetic recording medium according to claim 1, wherein
a value of σ1.5-σ0.5 is 0.6 N or less in a tensile test of the magnetic recording medium in the longitudinal direction, σ0.5 being a load at an elongation of 0.5% in the magnetic recording medium, σ1.5 being a load at an elongation of 1.5% in the magnetic recording medium.

21. The magnetic recording medium according to claim 1, wherein
a shrinkage ratio in the longitudinal direction when the magnetic recording medium is preserved at 60° C. for 72 hours is 0.1% or less.

22. The magnetic recording medium according to claim 1, wherein
a thickness of the magnetic recording medium is 5.6 μm or less.

23. The magnetic recording medium according to claim 1, wherein
a value of (TL−TB)/TB is 0.41 or less, TB being a thickness of the base material, TL being a thickness of the magnetic recording medium.

24. The magnetic recording medium according to claim 1, wherein
a Young's modulus of the magnetic recording medium in the longitudinal direction is 8.5 GPa or less.

25. The magnetic recording medium according to claim 1, wherein
a Young's modulus of the base material in the longitudinal direction is 8.0 GPa or less.

26. The magnetic recording medium according to claim 1, wherein
a width of the magnetic recording medium is adjusted by increasing or decreasing tension in the longitudinal direction.

27. A cartridge, including:
a tape-shaped magnetic recording medium including
a base material, and
a magnetic layer, the tape-shaped magnetic recording medium being long in a longitudinal direction and short in a width direction, wherein
the magnetic layer includes a data band long in the longitudinal direction and a servo band long in the longitudinal direction, a data signal being written to the data band, a servo signal being written to the servo band, a degree of perpendicular orientation of the magnetic layer being 65% or more,
a full width at half maximum of an isolated waveform in a reproduced waveform of the data signal is 185 nm or less,
a thickness of the magnetic layer is 90 nm or less, and
a thickness of the base material is 4.2 μm or less.

* * * * *